US011028941B2

(12) United States Patent
Ferreira et al.

(10) Patent No.: US 11,028,941 B2
(45) Date of Patent: Jun. 8, 2021

(54) METHODS AND APPARATUS FOR MONITORING SOLENOID VALVE HEALTH

(71) Applicant: GENERAL EQUIPMENT AND MANUFACTURING COMPANY, INC., Louisville, KY (US)

(72) Inventors: Thiago Caetano Ferreira, Jersey City, NJ (US); Patrick B. Mullaney, Louisville, KY (US); Bruce S. Rigsby, Charleston, IN (US)

(73) Assignee: GENERAL EQUIPMENT AND MANUFACTURING COMPANY, INC., Louisville, KY (US)

( * ) Notice: Subject to any disclaimer, the term of this patent is extended or adjusted under 35 U.S.C. 154(b) by 11 days.

(21) Appl. No.: 16/544,496

(22) Filed: Aug. 19, 2019

(65) Prior Publication Data

US 2021/0054949 A1    Feb. 25, 2021

(51) Int. Cl.
*F16K 37/00* (2006.01)
*F16K 31/06* (2006.01)

(52) U.S. Cl.
CPC ...... *F16K 37/0041* (2013.01); *F16K 31/0627* (2013.01); *F16K 37/0033* (2013.01)

(58) Field of Classification Search
CPC ............. F16K 37/0041; F16K 37/0033; F16K 31/0627
See application file for complete search history.

(56) References Cited

U.S. PATENT DOCUMENTS

| 5,329,956 A | * | 7/1994 | Marriott | ................. F16K 17/04 137/15.01 |
| 5,477,149 A | * | 12/1995 | Spencer | .............. F16K 37/0083 324/418 |
| 5,966,679 A | * | 10/1999 | Snowbarger | ........ F16K 37/0083 700/282 |
| 6,386,229 B1 | | 5/2002 | Morikawa et al. | |

(Continued)

OTHER PUBLICATIONS

Intellectual Property Office, "Combined Search and Examination Report," issued in connection with British Patent Application No. GB2002800.7, dated Jun. 15, 2020, 5 pages.

*Primary Examiner* — Reinaldo Sanchez-Medina
*Assistant Examiner* — Nicole Gardner
(74) *Attorney, Agent, or Firm* — Hanley, Flight & Zimmerman, LLC

(57) ABSTRACT

Methods and apparatus for monitoring solenoid valve health are disclosed. A switchbox includes a state manager, a position detector, and a notification generator. The state manager changes an activation state of a solenoid valve between a first state and a second state in response to an initiation signal of a solenoid valve test. The position detector determines, based on position data obtained at the switchbox from an integrated position sensor of the solenoid valve, whether a core of the solenoid valve has moved by at least a threshold change in position within a predetermined time period following the change of the activation state of the solenoid valve. The notification generator generates a notification in response to the position detector determining that the core did not move by at least the threshold change (Continued)

in position within the predetermined time period. The notification indicates that the solenoid valve failed the solenoid valve test.

22 Claims, 7 Drawing Sheets

(56) References Cited

U.S. PATENT DOCUMENTS

| | | | | |
|---|---|---|---|---|
| 7,877,194 | B2* | 1/2011 | Suyama | F16K 31/06 |
| | | | | 701/114 |
| 9,891,135 | B2* | 2/2018 | Aki | F15B 19/005 |
| 10,317,453 | B2* | 6/2019 | Narayanasamy | H01F 7/1844 |
| 2011/0260085 | A1 | 10/2011 | van der Zee et al. | |

* cited by examiner

METHODS AND APPARATUS FOR MONITORING SOLENOID VALVE HEALTH

FIELD OF THE DISCLOSURE

This disclosure relates generally to solenoid valves and, more specifically, to methods and apparatus for monitoring solenoid valve health.

BACKGROUND

Solenoid valves are commonly implemented to control the operation of actuators and/or main valves of process control environments. In some known implementations, the health and/or functionality of a solenoid valve can be tested and/or evaluated based on signals received from a pressure sensor configured to measure the downstream line pressure associated with the outlet of the solenoid valve. In other known implementations, the health and/or functionality of a solenoid valve can be tested and/or evaluated based on signals received from an integrated position sensor of the solenoid valve configured to measure the position of a core of the solenoid valve.

SUMMARY

Methods and apparatus for monitoring solenoid valve health are disclosed. In some examples, a switchbox is disclosed. In some disclosed examples, the switchbox comprises a state manager, a position detector, and a notification generator. In some disclosed examples, the state manager is configured to change an activation state of a solenoid valve between a first state and a second state in response to an initiation signal of a solenoid valve test. In some disclosed examples, the solenoid valve is operatively coupled to the switchbox. In some disclosed examples, the position detector is configured to determine, based on position data obtained at the switchbox from an integrated position sensor of the solenoid valve, whether a core of the solenoid valve has moved by at least a threshold change in position within a predetermined time period following the change of the activation state of the solenoid valve from the first state to the second state. In some disclosed examples, the notification generator is configured to generate a notification in response to the position detector determining that the core did not move by at least the threshold change in position within the predetermined time period. In some disclosed examples, the notification is to indicate that the solenoid valve failed the solenoid valve test.

In some examples, a method is disclosed. In some disclosed examples, the method comprises changing, via a switchbox, an activation state of a solenoid valve between a first state and a second state in response to an initiation signal of a solenoid valve test. In some disclosed examples, the solenoid valve is operatively coupled to the switchbox. In some disclosed examples, the method comprises determining, at the switchbox, based on position data obtained from an integrated position sensor of the solenoid valve, whether a core of the solenoid valve has moved by at least a threshold change in position within a predetermined time period following the changing of the activation state of the solenoid valve from the first state to the second state. In some disclosed examples, the method comprises generating, at the switchbox, a notification in response to determining that the core did not move by at least the threshold change in position within the predetermined time period. In some disclosed examples, the notification indicates that the solenoid valve failed the solenoid valve test.

In some examples, a non-transitory computer-readable storage medium comprising instructions is disclosed. In some disclosed examples, the instructions, when executed, cause one or more processors of a switchbox to change an activation state of a solenoid valve between a first state and a second state in response to an initiation signal of a solenoid valve test. In some disclosed examples, the solenoid valve is operatively coupled to the switchbox. In some disclosed examples, the instructions, when executed, cause the one or more processors of the switchbox to determine, based on position data obtained from an integrated position sensor of the solenoid valve, whether a core of the solenoid valve has moved by at least a threshold change in position within a predetermined time period following the change of the activation state of the solenoid valve from the first state to the second state. In some disclosed examples, the instructions, when executed, cause the one or more processors of the switchbox to generate a notification in response to determining that the core did not move by at least the threshold change in position within the predetermined time period. In some disclosed examples, the notification is to indicate that the solenoid valve failed the solenoid valve test.

Figure 1:
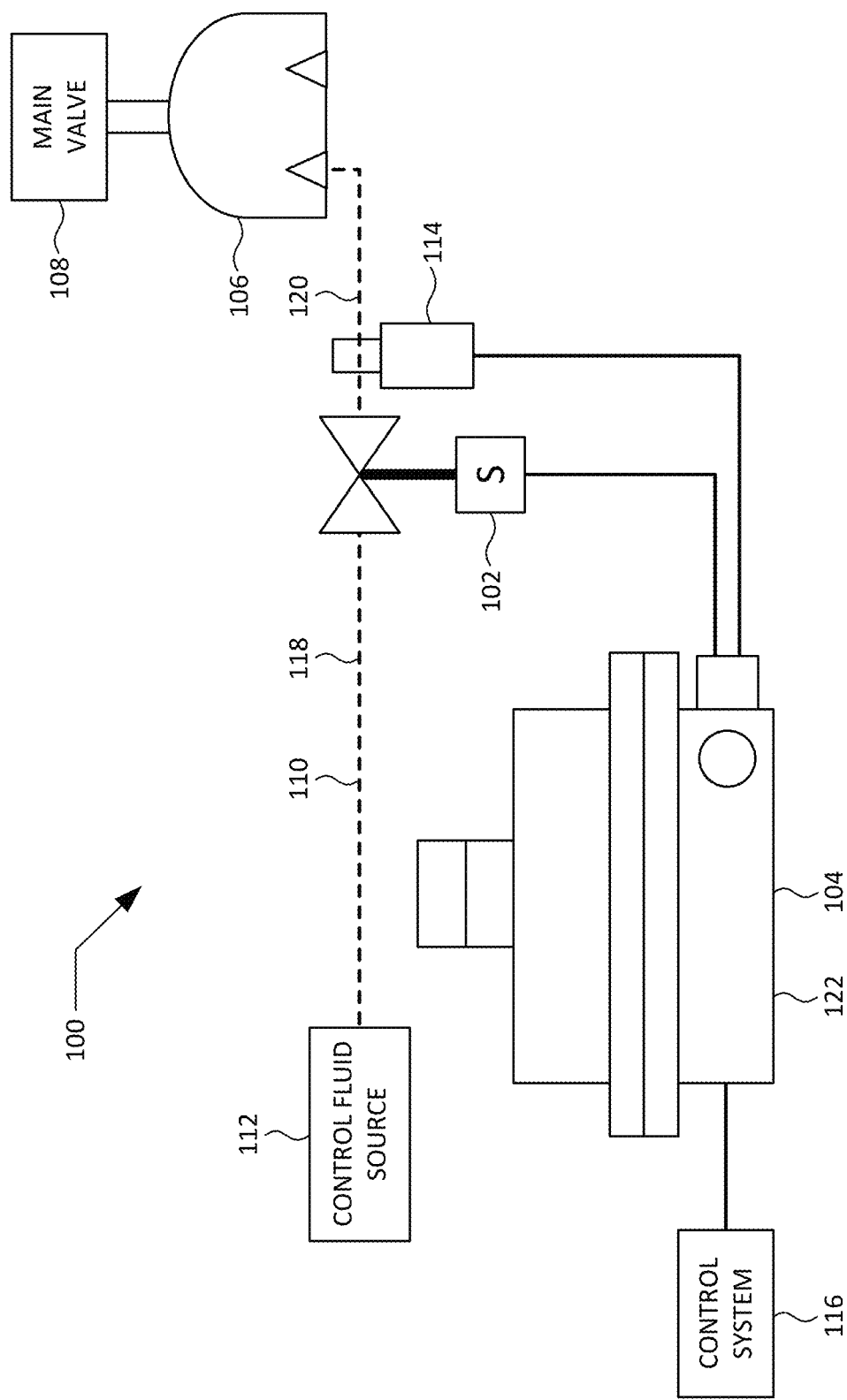
FIG. 1 illustrates an example process control environment including an example solenoid valve and an example switchbox configured to monitor the health and/or functionality of the solenoid valve.

Certain examples are shown in the above-identified figures and described in detail below. In describing these examples, identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Solenoid valves are commonly implemented to control the operation of actuators and/or main valves of process control environments. In some known implementations, the health and/or functionality of a solenoid valve can be tested and/or evaluated based on signals received from a pressure sensor configured to measure the downstream line pressure associated with the outlet of the solenoid valve. In some such implementations, a measured downstream line pressure that changes in response to a state change of the solenoid valve may suggest that the solenoid valve correctly changed a supply of pressurized fluid to an actuator, while a measured downstream line pressure that does not change in response to the state change of the solenoid valve may suggest that the solenoid valve did not correctly change the supply of pressurized fluid to the actuator. A failure of the solenoid valve to change the supply of the pressurized fluid to the actuator (e.g., as determined based on the measured downstream line pressure) in an anticipated and/or expected manner may indicate that the solenoid valve is unhealthy and/or not functioning properly.

In other known implementations, the health and/or functionality of a solenoid valve can be tested and/or evaluated based on signals received from an integrated position sensor of the solenoid valve configured to measure the position of a core of the solenoid valve. In some such implementations, a measured position of the core of the solenoid valve that is at or near a setpoint position may indicate that the solenoid valve is closed, while a measured position of the core of the solenoid valve that is spaced apart from the setpoint position may indicate that the solenoid valve is open. A failure of the solenoid valve to open or close (e.g., as determined based on the measured position of the core) in an anticipated and/or expected manner may indicate that the solenoid valve is unhealthy and/or not functioning properly.

The known methods described above for testing and/or evaluating the health and/or functionality of a solenoid valve have several shortcomings. For example, the known methods that rely exclusively on pressure sensor data provide only an indirect evaluation of the health and/or functionality of the solenoid valve. In this regard, leakage that is not attributable to the solenoid valve itself may cause changes in the downstream pressure detected via the pressure sensor. In such instances, the data obtained from pressure sensor may falsely suggest that the solenoid valve is unhealthy and/or not functioning properly. As another example, the known methods (e.g., both the known pressure-based methods and the known position-based methods described above) fail to prevent an actuator and/or a main valve that is operatively coupled to the solenoid valve from moving during and/or in response to the testing of the solenoid valve. As a result, the testing of the solenoid valve may interfere with the normal and/or intended operation of the actuator and/or the main valve at a time and/or in a manner that is undesirable. In this regard, the known methods may cause spurious trips of the actuator and/or the main valve. As another example, the known methods test and/or evaluate the health and/or functionality of the solenoid valve based on a single measured parameter (e.g., measured downstream line pressure or measured core position), and therefore do not provide a comprehensive diagnostic analysis with regard to the health and/or functionality of the solenoid valve.

Unlike the known methods described above, example methods and apparatus disclosed herein test and/or evaluate the health and/or functionality of a solenoid valve in a manner that advantageously prevents an actuator and/or a main valve that is/are operatively coupled to the solenoid valve from moving during and/or in response to the testing of the solenoid valve. As a result, testing and/or evaluating a solenoid valve according to example methods and apparatus disclosed herein does not interfere with the normal and/or intended operation of the actuator and/or the main valve. In some disclosed examples, the health and/or functionality of a solenoid valve is tested and/or evaluated based on multiple measured parameters associated with the solenoid valve including, for example, a measured position of a core of the solenoid valve, and one or more of a measured voltage supplied to the solenoid valve, a measured current drawn by the solenoid valve, and/or a measured downstream line pressure associated with the solenoid valve. In such multi-parameter examples, the testing and/or evaluating of the health and/or functionality of the solenoid valve via example methods and apparatus disclosed herein advantageously provides a diagnostic analysis that is relatively more comprehensive than that provided by the above-described known methods for testing and/or evaluating the health and/or functionality of a solenoid valve.

FIG. 1 illustrates an example process control environment 100 including an example solenoid valve 102 and an example switchbox 104 configured to monitor the health and/or functionality of the solenoid valve 102. The process control environment 100 of FIG. 1 further includes an example actuator 106, an example main valve 108, an example control fluid line 110, an example control fluid source 112, an example pressure sensor 114, and an example control system 116. In other examples, the process control environment 100 may include a greater number or a lesser number of components relative to those shown in FIG. 1. For example, the process control environment 100 may include a second solenoid valve in addition to the solenoid valve 102 shown in FIG. 1. As another example, the process control environment 100 may omit the pressure sensor 114 shown in FIG. 1.

In the illustrated example of FIG. 1, the solenoid valve 102 is operatively coupled to (e.g., in electrical communication with) the switchbox 104 of FIG. 1. The solenoid valve 102 is also operatively coupled to (e.g., in fluid communication with) the control fluid source 112 of FIG. 1 and the actuator 106 of FIG. 1. More specifically, a fluid inlet of the solenoid valve 102 receives pressurized control fluid from the control fluid source 112 via an example upstream segment 118 of the control fluid line 110 extending between the control fluid source 112 and the fluid inlet. A fluid outlet of the solenoid valve 102 expels and/or delivers pressurized control fluid to the actuator 106 via an example downstream segment 120 of the control fluid line 110 extending between the fluid outlet and the actuator 106.

In some examples, the pressurized control fluid supplied via the control fluid source 112 of FIG. 1 is pressurized air, and the actuator 106 is configured as a single-acting pneumatic actuator. In other examples, the pressurized control fluid supplied via the control fluid source 112 is pressurized air, and the actuator 106 is configured as a double-acting pneumatic actuator. In still other examples, the pressurized control fluid supplied by the control fluid source 112 is pressurized hydraulic fluid, and the actuator 106 is configured as either a single-acting or a double-acting hydraulic actuator. In some examples, the main valve 108 that is operatively coupled to the actuator 106 is configured as a rotary valve. In other examples, the main valve 108 may alternatively be configured as a sliding stem valve.

The solenoid valve 102 of FIG. 1 includes a core that controls the flow of the pressurized control fluid from the fluid inlet of the solenoid valve 102 to the fluid outlet of the solenoid valve. For example, when the core of the solenoid valve 102 is in a first position (e.g., as may occur in response to an electrical coil of the solenoid valve 102 being energized and/or activated), pressurized control fluid is able to flow from the fluid inlet of the solenoid valve 102 to the fluid outlet of the solenoid valve 102. In contrast, when the core of the solenoid valve 102 is in a second position (e.g., as may occur in response to the electrical coil of the solenoid valve 102 being de-energized and/or deactivated), pressurized control fluid is unable to flow from the fluid inlet of the solenoid valve 102 to the fluid outlet of the solenoid valve 102. Movements of the core of the solenoid valve of FIG. 1 are sensed and/or measured via an integrated position sensor of the solenoid valve 102.

Figure 2:
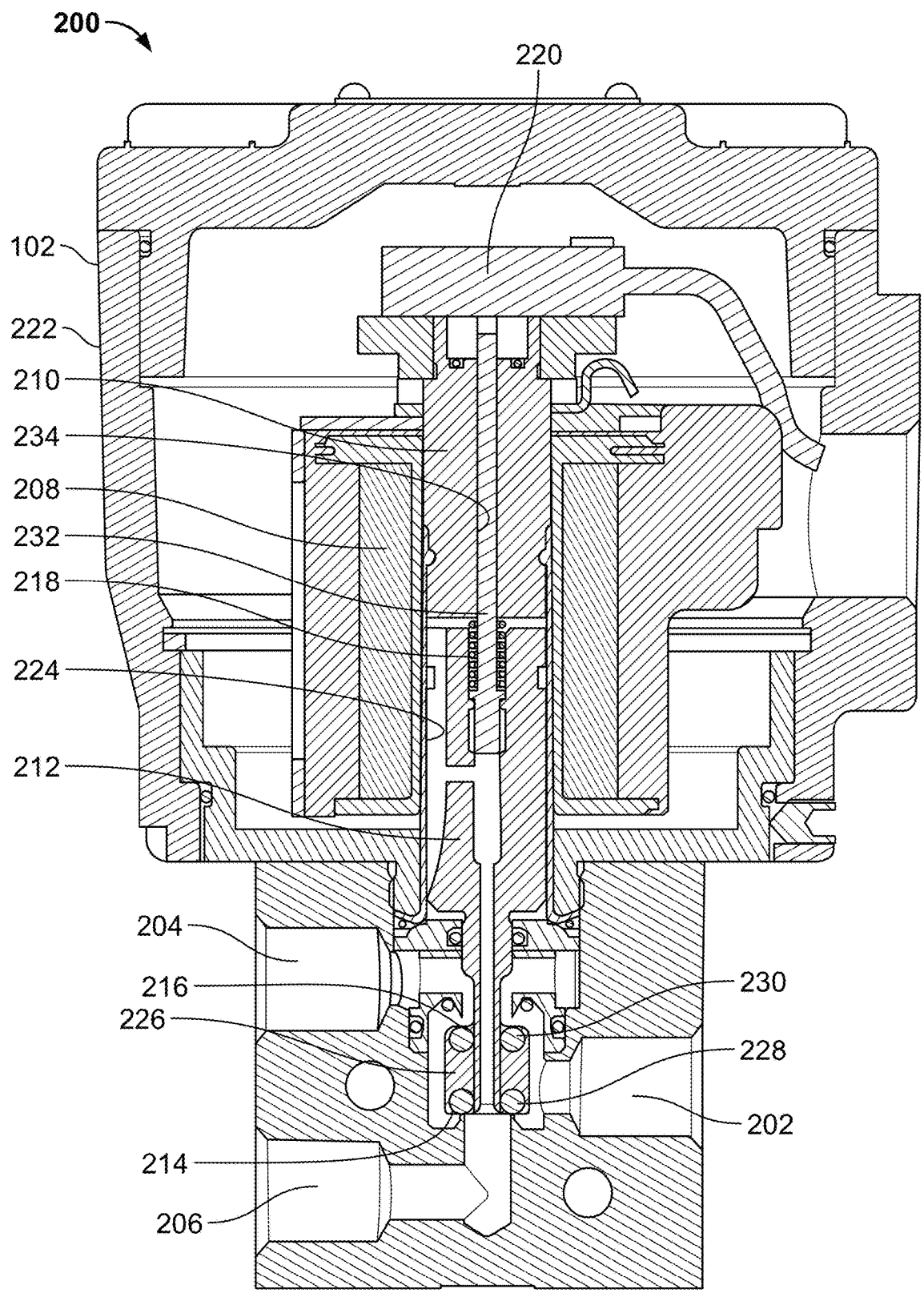
FIG. 2 is a cross-sectional view of an example implementation of the solenoid valve of FIG. 1.

FIG. 2 is a cross-sectional view of an example implementation 200 of the solenoid valve 102 of FIG. 1. In the illustrated example of FIG. 2, the solenoid valve 102 is a three-way valve having an example fluid inlet 202, a first example fluid outlet 204, and a second example fluid outlet 206. In other examples, the solenoid valve 102 may be of a different type and/or configuration relative to the example implementation 200 of FIG. 2. For example, the solenoid valve 102 may alternatively be implemented as a two-way valve having a single fluid inlet and a single fluid outlet.

In the illustrated example of FIG. 2, the fluid inlet 202 is configured to receive pressurized control fluid (e.g., pressurized air, pressurized hydraulic fluid, etc.) from an upstream control fluid line. The first fluid outlet 204 is configured to expel pressurized control fluid from the solenoid valve 102 to a first downstream control fluid line. The second fluid outlet 206 is configured to expel pressurized control fluid from the solenoid valve 102 to a second downstream control fluid line. In some examples, the first downstream control fluid line may operatively couple the first fluid outlet 204 of the solenoid valve 102 to a port of a single-acting actuator, and the second downstream control fluid line may operatively couple the second fluid outlet 206 of the solenoid valve 102 to a vent and/or atmosphere. In other examples, the first downstream control fluid line may operatively couple the first fluid outlet 204 of the solenoid valve 102 to a first port of a double-acting actuator, and the second downstream control fluid line may operatively couple the second fluid outlet 206 of the solenoid valve 102 to a second port of the double-acting actuator.

As shown in FIG. 2, the solenoid valve 102 further includes an example electrical coil 208, an example plugnut 210, an example core 212, a first example seat 214, a second example seat 216, an example spring 218, and an example position sensor 220, all of which are integrated within an example body 222 of the solenoid valve 102. The electrical coil 208 of the solenoid valve 102 generates a magnetic field in response to power (e.g., electrical voltage and electrical current) being supplied and/or delivered to the solenoid valve 102 via the switchbox 104. Generation of a magnetic field by the electrical coil 208 magnetizes the plugnut 210 of the solenoid valve 102, which is a static (e.g., non-movable) component of the solenoid valve 102. The plugnut 210 and the core 212 of the solenoid valve 102 are respectively located within an example cavity 224 formed in the body 222 of the solenoid valve 102. Magnetization of the plugnut 210 causes the core 212 of the solenoid valve 102, which is a dynamic (e.g., movable) component of the solenoid valve 102, to move within the cavity 224 in an axial direction toward the plugnut 210. Thus, the core 212 of the solenoid valve 102 is magnetically drawn toward the plugnut 210 of the solenoid valve 102 in response to the electrical coil 208 of the solenoid valve 102 being energized and/or activated.

When the supply and/or delivery of power to the solenoid valve 102 via the switchbox 104 ceases, the electrical coil 208 of the solenoid valve 102 no longer generates a magnetic field, and the plugnut 210 is no longer magnetized. The loss of magnetization of the plugnut 210 causes the core 212 of the solenoid valve 102 to move within the cavity 224 in an axial direction away from the plugnut 210 based on a biasing force generated by the spring 218 of the solenoid valve 102. Thus, the core 212 of the solenoid valve 102 is biased away from the plugnut 210 of the solenoid valve 102 in response to the electrical coil 208 of the solenoid valve 102 being de-energized and/or deactivated.

In the illustrated example of FIG. 2, the core 212 of the solenoid valve 102 includes an example head 226 having a first example seal 228 and a second example seal 230. The head 226 and/or, more generally, the core 212 of the solenoid valve 102 is movable within the cavity 224 along an axial direction between a first position in which the first seal 228 contacts the first seat 214 of the solenoid valve 102, and a second position in which the second seal 230 contacts the second seat 216 of the solenoid valve 102. When the head 226 and/or, more generally, the core 212 is in the first position (e.g., as may occur in response to the electrical coil 208 of the solenoid valve 102 being de-energized and/or deactivated), pressurized control fluid is able to flow from the fluid inlet 202 to the first fluid outlet 204, but is unable to flow from the fluid inlet 202 to the second fluid outlet 206. When the head 226 and/or, more generally, the core 212 is in the second position (e.g., as may occur in response to the electrical coil 208 of the solenoid valve 102 being energized and/or activated), pressurized control fluid is able to flow from the fluid inlet 202 to the second fluid outlet 206, but is unable to flow from the fluid inlet 202 to the first fluid outlet 204.

The core 212 of the solenoid valve 102 further includes an example detection rod 232 that extends within the cavity 224 along an axial direction away from the head 226, through an example bore 234 formed in the plugnut 210, and toward the position sensor 220 of FIG. 2. The position sensor 220 senses and/or measures the position of the detection rod 232 and/or, more generally, of the core 212 within the cavity 224 and/or the body 222 of the solenoid valve 102. In some examples, the position sensor 220 may be implemented via an inductive proximity sensor. In such examples, the position sensor 220 emits an electromagnetic field and monitors for changes in the magnetic field brought about by movement of the detection rod 232. The position sensor 220 may determine the position of the detection rod 232 and/or, more generally, of the core 212 based on magnetic field changes measured via a sensing coil of the position sensor 220.

In other examples, the position sensor 220 may be implemented by a different type and/or configuration of sensor relative to the aforementioned inductive proximity sensor. For example, the position sensor may alternatively be implemented by and/or as a potentiometer, a linear variable differential transformer (LVDT), a capacitive proximity sensor, an optical proximity sensor, an infrared proximity sensor, etc. Position data sensed and/or measured by and/or at the position sensor 220 may be of any quantity, type, form and/or format, and may be transmitted from the position sensor 220 of the solenoid valve 102 to the switchbox 104 of FIG. 1 for processing and/or storage, as further described below.

Returning to the illustrated example of FIG. 1, the switchbox 104 is operatively coupled to (e.g., in electrical communication with) the solenoid valve 102 as described above, and is further operatively coupled to the pressure sensor 114 and the control system 116 of FIG. 1. The pressure sensor 114 of FIG. 1 senses and/or measures the pressure of the pressurized control fluid at (e.g., flowing through) the downstream segment 120 of the control fluid line 110 of FIG. 1. The control system 116 of FIG. 1 exchanges signals, commands, and/or instructions with the switchbox 104 to control one or more operation(s) of the switchbox 104 and/or the solenoid valve 102 of FIG. 1, and/or to facilitate one or more controlled movement(s) of the actuator 106 and/or the main valve 108 of FIG. 1.

The switchbox 104 of FIG. 1 includes monitoring circuitry configured to monitor, test and/or evaluate the health and/or functionality of the solenoid valve 102 of FIG. 1. In some examples, the monitoring circuitry is integrated within, carried by, and/or mounted on an example housing 122 of the switchbox 104. The monitoring circuitry of the switchbox 104 includes one or more example processing device(s) (e.g., microprocessor(s), microcontroller(s), etc.) that facilitate testing and/or evaluating the health and/or functionality of the solenoid valve in a diagnostically comprehensive manner. For example, the processing device(s) of the monitoring circuitry may be configured to determine whether the position of the core of the solenoid valve 102 (e.g., as sensed and/or measured via the integrated position sensor of the solenoid valve 102) moves by at least a threshold change in position, determine whether the voltage supplied to the solenoid valve 102 satisfies a voltage threshold, determine whether the current drawn by the solenoid valve 102 satisfies a current threshold, and/or determine whether the downstream line pressure associated with the solenoid valve (e.g., as sensed and/or measured via the pressure sensor 114 of FIG. 1) satisfies a pressure threshold.

In some examples, one or more of the above-described processing device determination(s) is/are made in connection with a solenoid valve test administered by the switchbox 104. In some such examples, the processing device(s) of the monitoring circuitry may be further configured to change an activation state of the solenoid valve 102 between a first state (e.g., an energized and/or activated state) and a second state (e.g., a de-energized and/or deactivated state) in connection with the solenoid valve test, and to terminate and/or abort the solenoid valve test at a predetermined time period and/or duration following initiation of the solenoid valve test. The solenoid valve test administered by the switchbox 104 may be initiated in response to an initiation test signal, command, and or instruction received at the switchbox 104 from the control system 116 of FIG. 1, and/or received at the switchbox 104 via a user interface of the switchbox 104.

In some examples, the processing device(s) of the monitoring circuitry may be further configured to generate a notification indicating and/or identifying the outcome and/or result of the solenoid valve test (e.g., that the solenoid valve 102 passed the solenoid valve test, or that the solenoid valve 102 failed the solenoid valve test). In instances where the solenoid valve 102 failed the solenoid valve test administered by the switchbox 104 of FIG. 1, the processing device(s) of the monitoring circuitry may be further configured to generate one or more notifications indicating and/or identifying the basis and/or bases for failure, including, for example, that the position of the core of the solenoid valve 102 failed to move by at least the threshold change in position, that the voltage supplied to the solenoid valve 102 failed to satisfy the voltage threshold, that the current drawn by the solenoid valve 102 failed to satisfy the current threshold, and/or that the downstream line pressure associated with the solenoid valve 102 failed to satisfy the pressure threshold. The above-described notification(s) may be presented locally at the switchbox 104 via a display of the switchbox 104, and/or may be transmitted from the switchbox 104 to the control system 116 for further processing and/or analysis.

Figure 3:
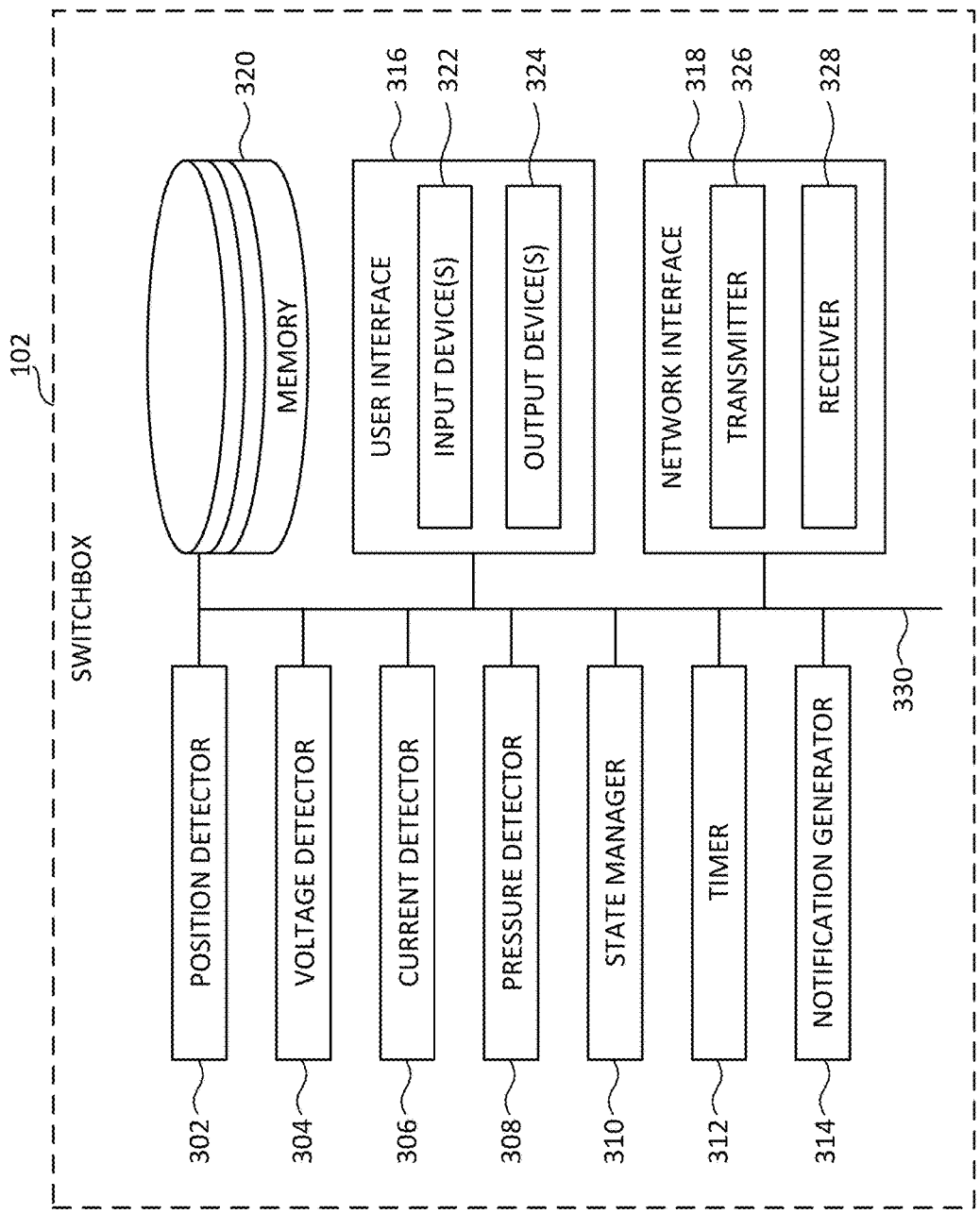
FIG. 3 is a block diagram of the example switchbox of FIG. 1 constructed in accordance with teachings of this disclosure.

FIG. 3 is a block diagram of the example switchbox 104 of FIG. 1 constructed in accordance with teachings of this disclosure. In the illustrated example of FIG. 3, the switchbox 104 includes an example position detector 302, an example voltage detector 304, an example current detector 306, an example pressure detector 308, an example state manager 310, an example timer 312, an example notification generator 314, an example user interface 316, an example network interface 318, and an example memory 320. The user interface 316 of FIG. 3 includes one or more example input device(s) 322 and one or more example output device (s) 324. The network interface 318 of FIG. 3 includes an example transmitter 326 and an example receiver 328. However, other example implementations of the switchbox 104 of FIG. 3 may include fewer or additional structures.

In the illustrated example of FIG. 3, the position detector 302, the voltage detector 304, the current detector 306, the pressure detector 308, the state manager 310, the timer 312, the notification generator 314, the user interface 316 (including the input device(s) 322 and the output device(s) 324), the network interface 318 (including the transmitter 326 and the receiver 328), and/or the memory 320 are operatively coupled (e.g., in electrical communication) via an example communication bus 330. The position detector 302, the voltage detector 304, the current detector 306, the pressure detector 308, the state manager 310, the timer 312, and/or the notification generator 314 of FIG. 3 may individually and/or collectively be implemented by any type(s) and/or any number(s) of semiconductor device(s) (e.g., microprocessor(s), microcontroller(s), etc.). In some examples, the position detector 302, the voltage detector 304, the current detector 306, the pressure detector 308, the state manager 310, the timer 312, the notification generator 314, the user interface 316 (including the input device(s) 322 and the output device(s) 324), the network interface 318 (including the transmitter 326 and the receiver 328), and/or the memory 320 of the switchbox 104 is/are integrated within, carried by, and/or mounted on a housing (e.g., the housing 122 of FIG. 1) of the switchbox 104.

The position detector 302 of FIG. 3 detects the position of the core 212 of the solenoid valve 102 of FIGS. 1 and 2 (e.g., as sensed and/or measured via the integrated position sensor 220 of the solenoid valve 102), and determines whether the position of the core 212 of the solenoid valve 102 has moved by at least a threshold change in position. In some examples, the threshold change in position associated with the core 212 of the solenoid valve 102 is stored in the memory 320 of FIG. 3, and is accessible to the position detector 302 therefrom. In some examples, the threshold change in position associated with the core 212 of the solenoid valve 102 is identified based on one or more input(s), command(s) and/or instruction(s) received at the switchbox 104 via the input device(s) 322 of the user interface 316 of FIG. 3. In other examples, the threshold change in position associated with the core 212 of the solenoid valve 102 is identified based on one or more signal(s), command(s) and/or instruction(s) received at the switchbox 104 via the receiver 328 of the network interface 318 of FIG. 3.

In some examples, the threshold change in position may correspond to a minimum change in position of the core 212 of the solenoid valve 102 which the core 212 of the solenoid valve 102 is to exceed in connection with passing a solenoid valve test, as further described below. In some examples, the threshold change in position may correspond to a relatively small, but detectable, change in the position of the core 212 of the solenoid valve 102. For example, the threshold change in position may correspond to a ripple and/or undulation in the position data sensed and/or measured via the position sensor 220 of the solenoid valve 102. Position data, change in position thresholds, and/or position data determinations sensed, measured, detected, accessed, processed, and/or generated by and/or at the position detector 302 may be of any quantity, type, form and/or format, and may be stored in a computer-readable storage medium such as the example memory 320 of FIG. 3 described below.

The voltage detector 304 of FIG. 3 senses, measures, and/or detects the voltage delivered from the switchbox 104 of FIGS. 1 and 3 to the solenoid valve 102 of FIGS. 1 and 2, and determines whether the detected voltage satisfies a voltage threshold. In some examples, the voltage threshold associated with the solenoid valve 102 is stored in the memory 320 of FIG. 3, and is accessible to the voltage detector 304 therefrom. In some examples, the voltage threshold associated with the solenoid valve 102 is identified based on one or more input(s), command(s) and/or instruction(s) received at the switchbox 104 via the input device(s) 322 of the user interface 316 of FIG. 3. In other examples, the voltage threshold associated with the solenoid valve 102 is identified based on one or more signal(s), command(s) and/or instruction(s) received at the switchbox 104 via the receiver 328 of the network interface 318 of FIG. 3.

In some examples, the voltage threshold may correspond to a maximum voltage which the voltage supplied to the solenoid valve 102 is not to exceed. In other examples, the voltage threshold may correspond to a minimum voltage which the voltage supplied to the solenoid valve 102 is not to fall below. In still other examples, the voltage threshold may correspond to a voltage range including both a maximum voltage which the voltage supplied to the solenoid valve 102 is not to exceed and a minimum voltage which the voltage supplied to the solenoid valve 102 is not to fall below. Voltage data, voltage thresholds, and/or voltage data determinations sensed, measured, detected, accessed, processed, and/or generated by and/or at the voltage detector 304 may be of any quantity, type, form and/or format, and may be stored in a computer-readable storage medium such as the example memory 320 of FIG. 3 described below.

The current detector 306 of FIG. 3 senses, measures, and/or detects the current delivered from the switchbox 104 of FIGS. 1 and 3 to the solenoid valve 102 of FIGS. 1 and 2, and determines whether the detected current satisfies a current threshold. In some examples, the current threshold associated with the solenoid valve 102 is stored in the memory 320 of FIG. 3, and is accessible to the current detector 306 therefrom. In some examples, the current threshold associated with the solenoid valve 102 is identified based on one or more input(s), command(s) and/or instruction(s) received at the switchbox 104 via the input device(s) 322 of the user interface 316 of FIG. 3. In other examples, the current threshold associated with the solenoid valve 102 is identified based on one or more signal(s), command(s) and/or instruction(s) received at the switchbox 104 via the receiver 328 of the network interface 318 of FIG. 3.

In some examples, the current threshold may correspond to a maximum current which the current drawn by the solenoid valve 102 is not to exceed. In other examples, the current threshold may correspond to a minimum current which the current drawn by the solenoid valve 102 is not to fall below. In still other examples, the current threshold may correspond to a current range including both a maximum current which the current drawn by the solenoid valve 102 is not to exceed and a minimum current which the current drawn by the solenoid valve 102 is not to fall below. Current data, current thresholds, and/or current data determinations sensed, measured, detected, accessed, processed, and/or generated by and/or at the current detector 306 may be of any quantity, type, form and/or format, and may be stored in a computer-readable storage medium such as the example memory 320 of FIG. 3 described below.

The pressure detector 308 of FIG. 3 detects the downstream line pressure associated with the solenoid valve 102 of FIGS. 1 and 2 (e.g., as sensed and/or measured via the pressure sensor 114 of FIG. 1), and determines whether the detected downstream line pressure satisfies a pressure threshold. In some examples, the pressure threshold associated with the downstream line pressure of the solenoid valve 102 is stored in the memory 320 of FIG. 3, and is accessible to the pressure detector 308 therefrom. In some examples, the pressure threshold associated with the downstream line pressure of the solenoid valve 102 is identified based on one or more input(s), command(s) and/or instruction(s) received at the switchbox 104 via the input device(s) 322 of the user interface 316 of FIG. 3. In other examples, the pressure threshold associated with the downstream line pressure of the solenoid valve 102 is identified based on one or more signal(s), command(s) and/or instruction(s) received at the switchbox 104 via the receiver 328 of the network interface 318 of FIG. 3.

In some examples, the pressure threshold may correspond to a maximum pressure which the downstream line pressure associated with the solenoid valve 102 is not to exceed. In other examples, the pressure threshold may correspond to a minimum pressure which the downstream line pressure associated with the solenoid valve 102 is not to fall below. In still other examples, the pressure threshold may correspond to a pressure range including both a maximum pressure which the downstream line pressure associated with the solenoid valve 102 is not to exceed and a minimum pressure which the downstream line pressure associated with the solenoid valve 102 is not to fall below. Pressure data, pressure thresholds, and/or pressure data determinations sensed, measured, detected, accessed, processed, and/or generated by and/or at the pressure detector 308 may be of any quantity, type, form and/or format, and may be stored in a computer-readable storage medium such as the example memory 320 of FIG. 3 described below.

The state manager 310 of FIG. 3 controls and/or manages an activation state of the solenoid valve 102 of FIGS. 1 and 2. For example, the state manager 310 may change the activation state of the solenoid valve 102 between a first state and a second state. In some examples, the first state is an activated state in which the switchbox 104 is configured to provide power to the solenoid valve 102, and the second state is a deactivated state in which the switchbox 104 is configured not to provide power to the solenoid valve 102. In other examples, the first state is a deactivated state in which the switchbox 104 is configured not to provide power to the solenoid valve 102, and the second state is an activated state in which the switchbox 104 is configured to provide power to the solenoid valve 102. Activation state data accessed, processed, and/or generated by and/or at the state manager 310 may be of any quantity, type, form and/or format, and may be stored in a computer-readable storage medium such as the example memory 320 of FIG. 3 described below.

Figure 4:
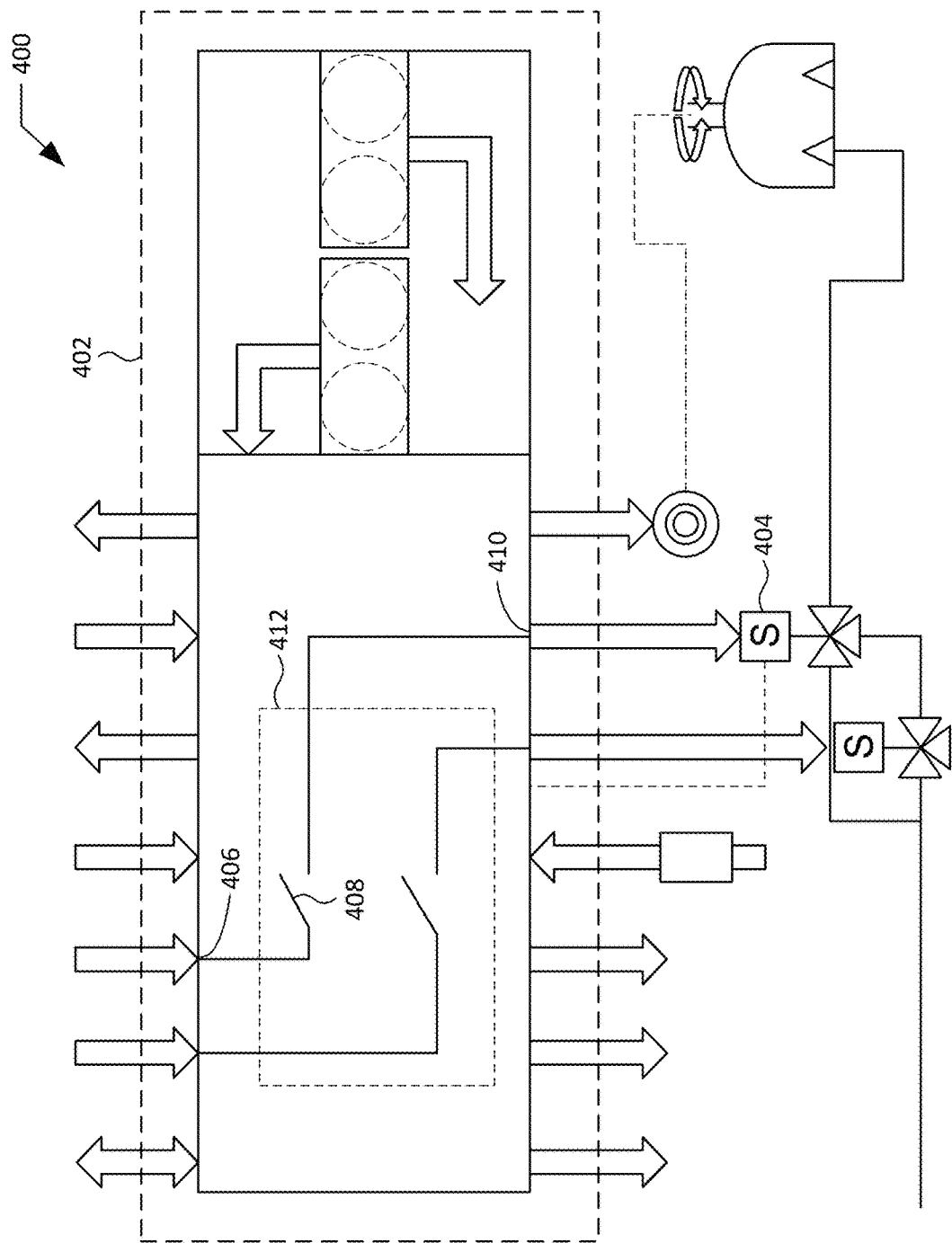
FIG. 4 is an example system configuration diagram for an example switchbox configured to monitor the health and/or functionality of an example solenoid valve.

In some examples, the state manager 310 changes the activation state of the solenoid valve 102 between the first state and the second state by signaling, commanding, and/or instructing a switch configured to selectively route power from the switchbox 104 to the solenoid valve 102 to move to either an open position (which blocks the power flow) or a closed position (which enables the power flow). For example, FIG. 4 is an example system configuration diagram 400 for an example switchbox 402 configured to monitor the health and/or functionality of an example solenoid valve 404. As shown in the system configuration diagram 400 of FIG. 4, the switchbox 402 includes an example power input 406, an example switch 408, an example power output 410, and example monitoring circuitry 412.

The power input 406 of FIG. 4 is configured to receive power from a power supply (e.g., a remotely located power source). The switch 408 of FIG. 4 is operatively positioned between the power input 406 and the power output 410 of FIG. 4, and is configured to selectively route power received at power input 406 to the power output 410. In some examples, the monitoring circuitry 412 of the switchbox 402 may signal, command, and/or instruct the switch 408 to move to either a closed position, which enables and/or facilitates a flow of power from the power input 406 to the power output 410, or an open position (e.g., as shown in FIG. 4), which blocks and/or prevents a flow of power from the power input 406 to the power output 410. When the switch 408 is commanded to the closed position, power flowing from the power input 406 through the switch 408 to the power output 410 is thereafter supplied and/or delivered from the switchbox 402 to the solenoid valve 404 of FIG. 4. In some examples, the operation of the switch 408 may be controlled and/or managed by a state manager of the monitoring circuitry 412, which may be implemented by and/or as the state manager 310 of FIG. 3 described herein. While the switch 408 of FIG. 4 is illustrated as being a mechanical switch, in other examples the switch 408 of FIG. 4 can be implemented as a different type of switch (e.g., a solid-state switch, a transistor, etc.) configured to control a flow of power between the power input 406 and the power output 410 of the switchbox 402.

Returning to the illustrated example of FIG. 3, the state manager 310 controls and/or manages various changes to the activation state of the solenoid valve 102 of FIGS. 1 and 2 in connection with the state manager 310 and/or, more generally, the switchbox 104 of FIGS. 1 and 3 administering a solenoid valve test configured to test the health and/or functionality of the solenoid valve 102. In some examples, the state manager 310 changes the activation state of the solenoid valve 102 from the first state to the second state in response to the state manager 310 and/or, more generally, the switchbox 104 receiving a test initiation signal, command, and/or instruction associated with the solenoid valve test. In some examples, the state manager 310 may receive the test initiation signal, command, and/or instruction based on one or more input(s), command(s) and/or instruction(s) received at the switchbox 104 via the input device(s) 322 of the user interface 316 of FIG. 3. In other examples, the state manager 310 may receive the test initiation signal, command, and/or instruction based on one or more signal(s), command(s) and/or instruction(s) received at the switchbox 104 via the receiver 328 of the network interface 318 of FIG. 3. The solenoid valve test administered by the state manager 310 and/or the switchbox 104 can occur at any time, including, for example, prior to the occurrence of a partial stroke test, during the occurrence of a partial stroke test, etc.

The state manager 310 changes the activation state of the solenoid valve 102 from the second state back to the first state in response to the position detector 302 of FIG. 3 determining, in connection with the solenoid valve test, that the core 212 of the solenoid valve 102 moved by at least the threshold change in position within a predetermined time period. In this regard, the state manager 310 of FIG. 3 also manages and/or controls the initiation of the timer 312 of FIG. 3. For example, the state manager 310 may signal, command and/or instruct the timer 312 to initiate and/or commence measurement of a predetermined time period and/or duration associated with the solenoid valve test, as further described below. In some examples, the state manager 310 may signal, command and/or instruct the timer 312 to initiate and/or commence measurement of the predetermined time period and/or duration in response to the state manager 310 changing of the activation state of the solenoid valve 102 from the first state to the second state, as may occur in connection with the state manager 310 and/or, more generally, the switchbox 104 administering the solenoid valve test.

The state manager 310 aborts and/or terminates the solenoid valve test (e.g., by changing the activation state of the solenoid valve 102 from the second state back to the first state) in response to one or more determination(s) made by the timer 312, the voltage detector 304, the current detector 306, and/or the pressure detector 308 of the switchbox 104 of FIGS. 1 and 3. For example, the state manager 310 may abort the solenoid valve test in response to the predetermined time period and/or duration of the timer 312 of FIG. 3 expiring without the position detector 302 of FIG. 3 determining that the core 212 of the solenoid valve 102 moved by at least the threshold change in position. As another example, the state manager 310 may abort the solenoid valve test in response to the voltage detector 304 of FIG. 3 determining that the voltage supplied to the solenoid valve 102 failed to satisfy the voltage threshold. As another example, the state manager 310 may abort the solenoid valve test in response to the current detector 306 of FIG. 3 determining that the current drawn by the solenoid valve 102 failed to satisfy the current threshold. As another example, the state manager 310 may abort the solenoid valve test in response to the pressure detector 308 of FIG. 3 determining that the downstream line pressure associated with the solenoid valve 102 failed to satisfy the pressure threshold.

Returning to the illustrated example of FIG. 3, the timer 312 of FIG. 3 measures a predetermined time period and/or duration. For example, the timer 312 may measure a predetermined time period and/or duration by counting and/or measuring from time zero upward to a time limit corresponding to the end of the predetermined time period and/or duration, or by counting and/or measuring from such a time limit downward to time zero. In some examples, the predetermined time period and/or duration of the timer 312 is stored in the memory 320 of FIG. 3, and is accessible to the timer 312 therefrom. In some examples, the predetermined time period and/or duration of the timer 312 is identified based on one or more input(s), command(s) and/or instruction(s) received at the switchbox 104 via the input device(s) 322 of the user interface 316 of FIG. 3. In other examples, the predetermined time period and/or duration of the timer 312 is identified based on one or more signal(s), command(s) and/or instruction(s) received at the switchbox 104 via the receiver 328 of the network interface 318 of FIG. 3.

In some examples, the timer 312 initiates and/or commences measurement of the predetermined time period and/or duration in response to the state manager 310 of FIG. 3 changing of the activation state of the solenoid valve 102 of FIGS. 1 and 2 from the first state to the second state, as may occur in connection with the switchbox 104 administering a solenoid valve test. In such examples, the predetermined time period and/or duration of the timer 312 generally defines the maximum duration of the solenoid valve test being administered by the switchbox 104. For example, expiration of the predetermined time period and/or duration of the timer 312 prior to the position detector 302 of FIG. 3 determining that the core 212 of the solenoid valve 102 of FIGS. 1 and 2 has moved by at least the threshold change in position causes the state manager 310 of FIG. 3 to change the activation state of the solenoid valve from the second state back to the first state, thereby ending the solenoid valve test.

In some examples, the predetermined time period and/or duration of the timer 312 is advantageously configured (e.g., set and/or established) to expire prior to an actuator (e.g., the actuator 106 of FIG. 1) and/or a main valve (e.g., the main valve 108 of FIG. 1) that is/are operatively coupled to the solenoid valve 102 of FIGS. 1 and 2 moving in response to the change of the activation state of the solenoid valve 102 from the first state to the second state. The switchbox 104 of FIGS. 1 and 3 can accordingly test the health and/or functionality of the solenoid valve 102 of FIGS. 1 and 2 without interfering with the normal and/or intended operation of the operatively coupled actuator and/or main valve. Time data, predetermined time periods and/or durations, and/or time data determinations measured, detected, accessed, processed, and/or generated by and/or at the timer 312 may be of any quantity, type, form and/or format, and may be stored in a computer-readable storage medium such as the example memory 320 of FIG. 3 described below.

The notification generator 314 of FIG. 3 generates one or more notification(s) (e.g., one or more message(s) and/or alert(s)) indicating and/or identifying the health, health status, functionality, and/or functional status of the solenoid valve 102, as determined based on one or more test(s) of the solenoid valve 102 administered by the switchbox 104. Data corresponding to the notification(s) generated by the notification generator 314 may be of any quantity, type, form and/or format, and may be stored in a computer-readable storage medium such as the example memory 320 of FIG. 3 described below.

In some examples, the notification generator 314 generates one or more notification(s) indicating and/or identifying that the solenoid valve 102 is functioning properly and/or that the solenoid valve 102 passed a solenoid valve test administered by the switchbox 104. In some such examples, the notification(s) generated by the notification generator 314 may additionally or alternatively indicate and/or identify that the core 212 of the solenoid valve 102 moved by at least the threshold change in position prior to the expiration of the timer 312 of FIG. 3 (e.g., as determined by the position detector 302, the state manager 310, and the timer 312 of FIG. 3), that the voltage supplied to the solenoid valve 102 satisfied the voltage threshold (e.g., as determined by the voltage detector 304 of FIG. 3), that the current drawn by the solenoid valve 102 satisfied the current threshold (e.g., as determined by the current detector 306 of FIG. 3), and/or that the downstream line pressure associated with the solenoid valve 102 satisfied the pressure threshold (e.g., as determined by the pressure detector 308 of FIG. 3).

In other examples, the notification generator 314 instead generates one or more notification(s) indicating and/or identifying that the solenoid valve 102 is not functioning properly and/or that the solenoid valve 102 failed a solenoid valve test administered by the switchbox 104. In some such examples, the notification(s) generated by the notification generator 314 additionally or alternatively indicate and/or identify that the core 212 of the solenoid valve 102 did not move by at least the threshold change in position prior to the expiration of the timer 312 of FIG. 3 (e.g., as determined by the position detector 302, the state manager 310, and the timer 312 of FIG. 3), that the voltage supplied to the solenoid valve 102 did not satisfy the voltage threshold (e.g., as determined by the voltage detector 304 of FIG. 3), that the current drawn by the solenoid valve 102 did not satisfy the current threshold (e.g., as determined by the current detector 306 of FIG. 3), and/or that the downstream line pressure associated with the solenoid valve 102 did not satisfy the pressure threshold (e.g., as determined by the pressure detector 308 of FIG. 3).

The user interface 316 of FIG. 3 facilitates interactions and/or communications between an end user and the switchbox 104. The user interface 316 includes one or more input device(s) 322 via which the user may input information and/or data to the switchbox 104. For example, the input device(s) 322 may include one or more button(s), switch(es), knob(s), touchscreen(s), audio sensor(s), and/or microphone(s) that enable(s) the user to convey data and/or commands to the position detector 302, the voltage detector 304, the current detector 306, the pressure detector 308, the state manager 310, the timer 312, and/or the memory 320 of FIG. 3, and/or, more generally, to the switchbox 104. In some examples, data and/or commands conveyed via the input device(s) 322 of the user interface 316 may indicate and/or identify a threshold change in position associated with the core 212 of the solenoid valve 102 of FIG. 1, a voltage threshold associated with a voltage supplied to the solenoid valve 102 of FIG. 1, a current threshold associated with a current drawn by the solenoid valve 102 of FIG. 1, a pressure threshold associated with a downstream line pressure of the solenoid valve 102 of FIG. 1, a duration (e.g., a time period and/or time limit) associated with the timer 312 of FIG. 3, and/or an instruction to initiate a solenoid valve test. Data and/or information that is received via the input device(s) 322 of the user interface 316 may be of any quantity, type, form and/or format, and may be stored in a computer-readable storage medium such as the example memory 320 of FIG. 3 described below.

The user interface 316 of FIG. 3 also includes one or more output device(s) 324 via which the user interface 316 presents information and/or data in visual and/or audible form to the user. For example, the output device(s) 324 may include a light emitting diode, a touchscreen, and/or a liquid crystal display for presenting visual information, and/or a speaker for presenting audible information. In some examples, information and/or data presented by the output device(s) 324 of the user interface 316 may indicate and/or identify the content of one or more notification(s) generated by the notification generator 314 of FIG. 3. For example, information and/or data presented by the output device(s) 324 of the user interface 316 may indicate and/or identify that the solenoid valve 102 of FIG. 1 is functioning properly, and/or that the solenoid valve 102 of FIG. 1 passed a solenoid valve test administered by the switchbox 104. As another example, information and/or data presented by the output device(s) 324 of the user interface 316 may indicate and/or identify that the solenoid valve 102 of FIG. 1 is not functioning properly, and/or that the solenoid valve 102 of FIG. 1 failed a solenoid valve test administered by the switchbox 104. Data and/or information that is presented via the output device(s) 324 of the user interface 316 may be of any quantity, type, form and/or format, and may be stored in a computer-readable storage medium such as the example memory 320 of FIG. 3 described below.

The network interface 318 of FIG. 3 enables and/or facilitates one or more network-based communication(s) between the switchbox 104 of FIGS. 1 and 3 and one or more external device(s) (e.g., the control system 116 of FIG. 1). In some examples, the network-based communication(s) enabled by the network interface 318 occur via a network facilitated via 4-20 mA wiring and/or via one or more communication protocol(s) including, for example, Highway Addressable Remote Transducer (HART), Transmission Control Protocol/Internet Protocol (TCP/IP), Foundation Fieldbus, Profinet, Modbus and/or Ethernet. As mentioned above, the network interface 318 of FIG. 3 includes the transmitter 326 and the receiver 328 of FIG. 3, each of which is further described below.

The transmitter 326 of FIG. 3 transmits data and/or one or more signal(s) over a network (e.g., a HART network) to one or more external device(s) (e.g., the control system 116 of FIG. 1). In some examples, the data and/or signal(s) transmitted by the transmitter 326 correspond to one or more notification(s) generated by the notification generator 314 of FIG. 3. For example, the data and/or signal(s) transmitted by the transmitter 326 of the network interface 318 may indicate and/or identify that the solenoid valve 102 of FIG. 1 is functioning properly, and/or that the solenoid valve 102 of FIG. 1 passed a solenoid valve test administered by the switchbox 104. As another example, the data and/or signal(s) transmitted by the transmitter 326 of the network interface 318 may indicate and/or identify that the solenoid valve 102 of FIG. 1 is not functioning properly, and/or that the solenoid valve 102 of FIG. 1 failed a solenoid valve test administered by the switchbox 104. Data corresponding to the signal(s) to be transmitted by the transmitter 326 of the network interface 318 may be of any quantity, type, form and/or format, and may be stored in a computer-readable storage medium such as the example memory 320 of FIG. 3 described below The receiver 328 of FIG. 3 collects, acquires and/or receives data and/or one or more signal(s) over a network (e.g., a HART network) from one or more external device(s) (e.g., the control system 116 of FIG. 1). In some examples, the data and/or signal(s) collected and/or received by the receiver 328 of the network interface 318 may indicate and/or identify a threshold change in position associated with the core 212 of the solenoid valve 102 of FIG. 1, a voltage threshold associated with a voltage supplied to the solenoid valve 102 of FIG. 1, a current threshold associated with a current drawn by the solenoid valve 102 of FIG. 1, a pressure threshold associated with a downstream line pressure of the solenoid valve 102 of FIG. 1, a duration (e.g., a time period and/or time limit) associated with the timer 312 of FIG. 3, and/or an instruction to initiate a solenoid valve test. Data carried by and/or derived from the signal(s) collected and/or received by the receiver 328 of the network interface 318 may be of any quantity, type, form and/or format, and may be stored in a computer-readable storage medium such as the example memory 320 of FIG. 3 described below.

The example memory 320 of FIG. 3 may be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 320 may be stored in any file and/or data structure format, organization scheme, and/or arrangement. The memory 320 of FIG. 3 is accessible to the position detector 302, the voltage detector 304, the current detector 306, the pressure detector 308, the state manager 310, the timer 312, the notification generator 314, the user interface 316 (including the input device(s) 322 and the output device(s) 324), and/or the network interface 318 (including the transmitter 326 and the receiver 328) of FIG. 3, and/or, more generally, to the switchbox 104.

In some examples, the memory 320 stores a threshold change in position associated with the core 212 of the solenoid valve 102 of FIG. 1. In some examples, the memory 320 stores position data associated with the position of the core 212 of the solenoid valve 102 of FIG. 1, as detected by the position detector 302 of FIG. 3. In some examples, the memory 320 stores a voltage threshold associated with a voltage supplied to the solenoid valve 102 of FIG. 1. In some examples, the memory 320 stores voltage data associated with the voltage supplied to the solenoid valve 102 of FIG. 1, as detected by the voltage detector 304 of FIG. 3. In some examples, the memory 320 stores a current threshold associated with a current drawn by the solenoid valve 102 of FIG. 1. In some examples, the memory 320 stores current data associated with the current drawn by the solenoid valve 102 of FIG. 1, as detected by the current detector 306 of FIG. 3. In some examples, the memory 320 stores a pressure threshold associated with a downstream line pressure of the solenoid valve 102 of FIG. 1. In some examples, the memory 320 stores pressure data associated with the downstream line pressure of the solenoid valve 102 of FIG. 1, as detected by the pressure detector 308 of FIG. 3.

In some examples, the memory 320 stores data corresponding to an instruction to initiate a solenoid valve test to be administered by the switchbox 104, as may be received via the input device(s) 322 of the user interface 316 of FIG. 3, and/or via the receiver 328 of the network interface 318 of FIG. 3. In some examples, the memory 320 stores a duration (e.g., a time period and/or time limit) associated with the timer 312 of FIG. 3, and/or associated with a solenoid valve test to be administered by the switchbox 104. In some examples, the memory 320 stores data corresponding to one or more notification(s) generated by the notification generator 314 of FIG. 3, presented via the output device(s) 324 of the user interface 316 of FIG. 3, and/or transmitted via the transmitter 326 of the network interface 318 of FIG. 3.

While an example manner of implementing the switchbox 104 is illustrated in FIGS. 1 and 3, one or more of the elements, processes and/or devices illustrated in FIGS. 1 and 3 may be combined, divided, re-arranged, omitted, eliminated and/or implemented in any other way. Further, the example position detector 302, the example voltage detector 304, the example current detector 306, the example pressure detector 308, the example state manager 310, the example timer 312, the example notification generator 314, the example user interface 316, the example network interface 318, the example memory 320, and/or, more generally, the example switchbox 104 of FIGS. 1 and 3 may be implemented by hardware, software, firmware and/or any combination of hardware, software and/or firmware. Thus, for example, any of the example position detector 302, the example voltage detector 304, the example current detector 306, the example pressure detector 308, the example state manager 310, the example timer 312, the example notification generator 314, the example user interface 316, the example network interface 318, the example memory 320, and/or, more generally, the example switchbox 104 of FIGS. 1 and 3 could be implemented by one or more analog or digital circuit(s), logic circuit(s), programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example position detector 302, the example voltage detector 304, the example current detector 306, the example pressure detector 308, the example state manager 310, the example timer 312, the example notification generator 314, the example user interface 316, the example network interface 318, and/or the example memory 320 of FIG. 3 is/are hereby expressly defined to include a non-transitory computer-readable storage device or storage disk such as a memory, a flash drive, a hard drive, etc. including the software and/or firmware. Further still, the example position detector 302, the example voltage detector 304, the example current detector 306, the example pressure detector 308, the example state manager 310, the example timer 312, the example notification generator 314, the example user interface 316, the example network interface 318, the example memory 320, and/or, more generally, the example switchbox 104 of FIGS. 1 and 3 may include one or more element(s), process(es) and/or device(s) in addition to, or instead of, those illustrated in FIGS. 1 and 3, and/or may include more than one of any or all of the illustrated elements, processes and devices. As used herein, the phrase "in communication," including variations thereof, encompasses direct communication and/or indirect communication through one or more intermediary component(s), and does not require direct physical (e.g., wired) communication and/or constant communication, but rather additionally includes selective communication at periodic intervals, scheduled intervals, aperiodic intervals, and/or one-time events.

Figure 5:
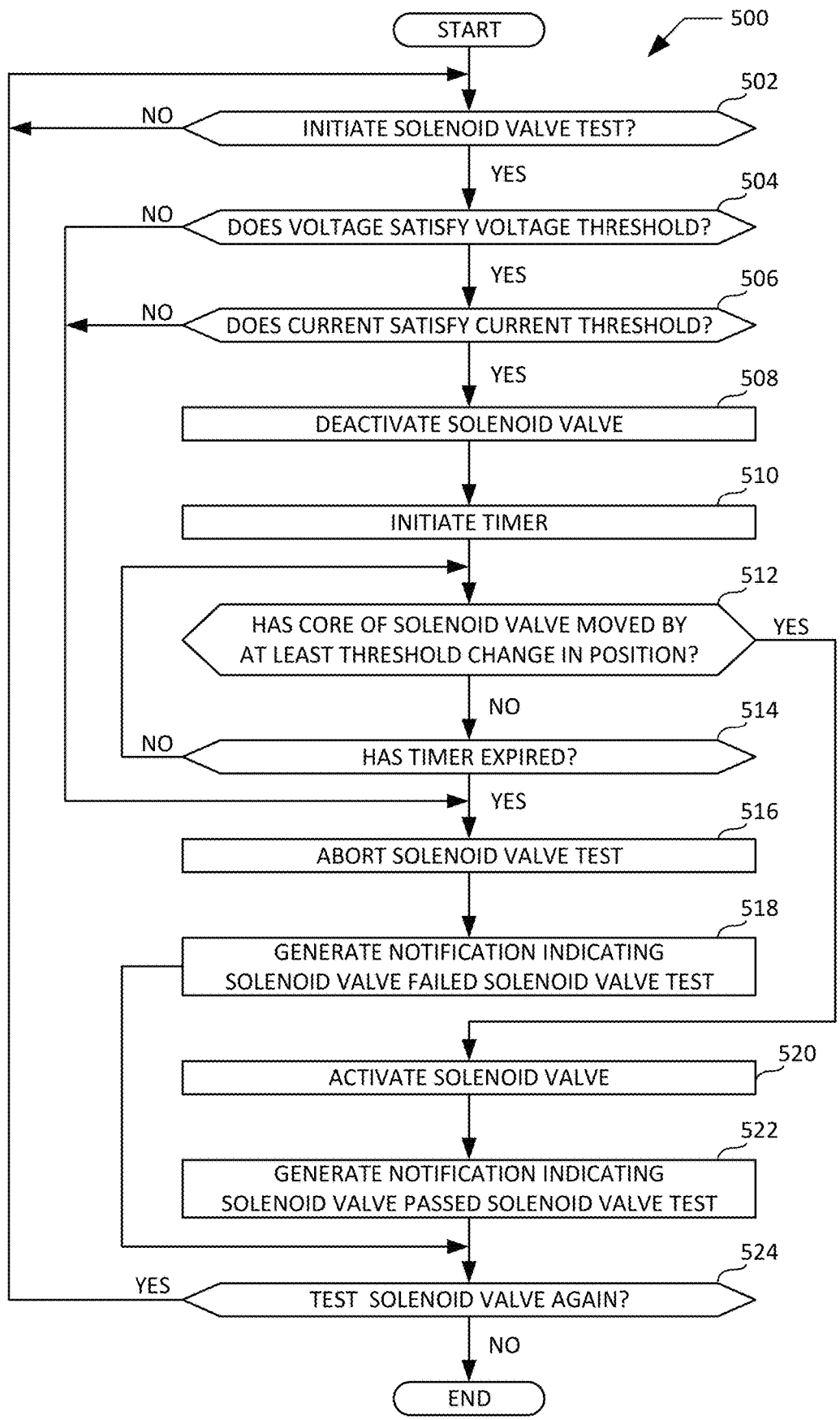
FIG. 5 is a flowchart representative of first example machine-readable instructions that may be executed to implement the example switchbox of FIGS. 1 and 3 to monitor the health and/or functionality of the example solenoid valve of FIGS. 1 and 2.
Figure 6:
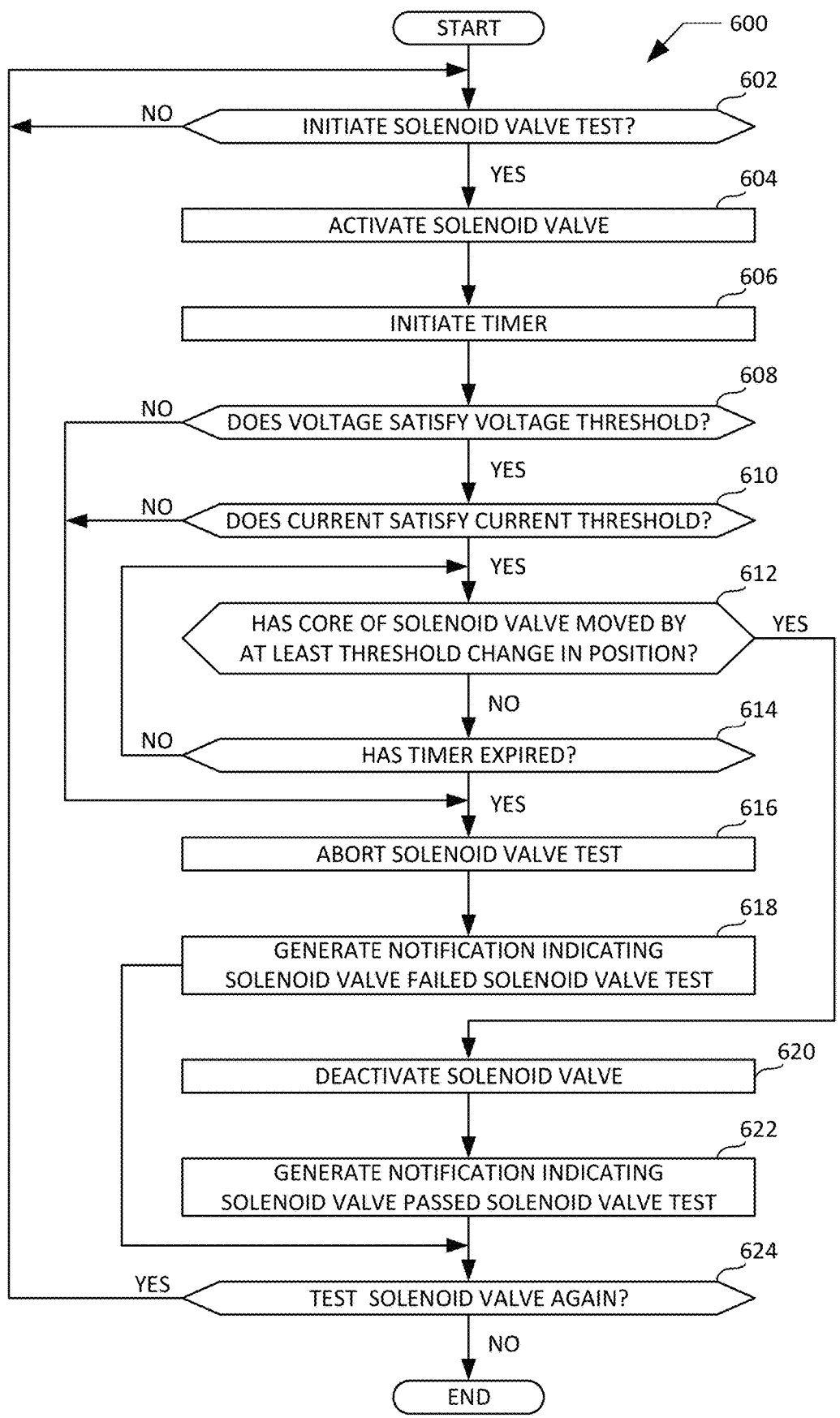
FIG. 6 is a flowchart representative of second example machine-readable instructions that may be executed to implement the example switchbox of FIGS. 1 and 3 to monitor the health and/or functionality of the example solenoid valve of FIGS. 1 and 2.

Flowcharts representative of example hardware logic, machine-readable instructions, hardware implemented state machines, and/or any combination thereof for implementing the switchbox 104 of FIGS. 1 and 3 are shown in FIGS. 5 and 6. The machine-readable instructions may be one or more executable program(s) or portion(s) of executable program(s) for execution by a computer processor such as the example processor 702 shown in the example processor platform 700 discussed below in connection with FIG. 7. The program(s) may be embodied in software stored on a non-transitory computer-readable storage medium such as a CD-ROM, a floppy disk, a hard drive, a DVD, a Blu-ray disk, or a memory associated with the processor 702, but the entire program(s) and/or parts thereof could alternatively be executed by a device other than the processor 702 and/or embodied in firmware or dedicated hardware. Further, although the example program(s) is/are described with reference to the flowcharts illustrated in FIGS. 5 and 6, many other methods of implementing the example switchbox 104 of FIGS. 1 and 3 may alternatively be used. For example, the order of execution of the blocks may be changed, and/or some of the blocks described may be changed, eliminated, or combined. Additionally or alternatively, any or all of the blocks may be implemented by one or more hardware circuit(s) (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a packaged format, etc. Machine-readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage device(s) and/or computing device(s) (e.g., servers). The machine-readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein. In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

As mentioned above, the example processes of FIGS. 5 and 6 may be implemented using executable instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 5 is a flowchart representative of first example machine-readable instructions 500 that may be executed to implement the example switchbox 104 of FIGS. 1 and 3 to monitor the health and/or functionality of the example solenoid valve 102 of FIGS. 1 and 2. The example program 500 of FIG. 5 begins when the switchbox 104 of FIGS. 1 and 3 determines whether to initiate a solenoid valve test (block 502). For example, the switchbox 104 may receive (e.g., via the input device(s) 322 of the user interface 316 of FIG. 3, or via the receiver 328 of the network interface 318 of FIG. 3) one or more input(s), signal(s), command(s) and/or instruction(s) indicating that a solenoid valve test is to be initiated. If the switchbox 104 does not determine at block 502 that a solenoid valve test is to be initiated, control of the example program 500 of FIG. 5 remains at block 502. If the switchbox 104 instead determines at block 502 that a solenoid valve test is to be initiated, control of the example program 500 of FIG. 5 proceeds to block 504.

At block 504, the voltage detector 304 of FIG. 3 determines whether a voltage supplied to the solenoid valve 102 of FIGS. 1 and 2 satisfies a voltage threshold. For example, the voltage detector 304 may determine that a voltage supplied to the solenoid valve 102 satisfies a first voltage threshold that requires the voltage to be less than a predetermined maximum voltage. As another example, the voltage detector 304 may determine that a voltage supplied to the solenoid valve 102 satisfies a second voltage threshold that requires the voltage to be greater than a predetermined minimum voltage. As another example, the voltage detector 304 may determine that a voltage supplied to the solenoid valve 102 satisfies a third voltage threshold that requires the voltage to be both greater than a predetermined minimum voltage and less than a predetermined maximum voltage. If the voltage detector 304 determines at block 504 that the voltage supplied to the solenoid valve 102 satisfies the voltage threshold, control of the example program 500 of FIG. 5 proceeds to block 506. If the voltage detector 304 instead determines at block 504 that the voltage supplied to the solenoid valve 102 does not satisfy the voltage threshold, control of the example program 500 of FIG. 5 proceeds to block 516.

At block 506, the current detector 306 of FIG. 3 determines whether a current drawn by the solenoid valve 102 of FIGS. 1 and 2 satisfies a current threshold. For example, the current detector 306 may determine that a current drawn by the solenoid valve 102 satisfies a first current threshold that requires the current to be less than a predetermined maximum current. As another example, the current detector 306 may determine that a current drawn by the solenoid valve 102 satisfies a second current threshold that requires the current to be greater than a predetermined minimum current. As another example, the current detector 306 may determine that a current drawn by the solenoid valve 102 satisfies a third current threshold that requires the current to be both greater than a predetermined minimum current and less than a predetermined maximum current. If the current detector 306 determines at block 506 that the current drawn by the solenoid valve 102 satisfies the current threshold, control of the example program 500 of FIG. 5 proceeds to block 508. If the current detector 306 instead determines at block 506 that the current drawn by the solenoid valve 102 does not satisfy the current threshold, control of the example program 500 of FIG. 5 proceeds to block 516.

At block 508, the state manager 310 of FIG. 3 deactivates the solenoid valve 102 of FIGS. 1 and 2. For example, the state manager 310 may change the state of the solenoid valve 102 from an activated state in which the switchbox 104 of FIGS. 1 and 3 provides power to the solenoid valve 102 to a deactivated state in which the switchbox 104 of FIGS. 1 and 3 does not provide power to the solenoid valve 102. Following block 508, control of the example program 500 of FIG. 5 proceeds to block 510.

At block 510, the state manager 310 of FIG. 3 initiates the timer 312 of FIG. 3. For example, the state manager 310 may signal, command, and/or instruct the timer 312 to initiate a timed measurement (e.g., from time zero upward to a time limit, or from a time limit downward to time zero) having a predetermined period, duration, and/or limit. Following block 510, control of the example program 500 of FIG. 5 proceeds to block 512.

At block 512, the position detector 302 of FIG. 3 determines whether the core 212 of the solenoid valve 102 of FIGS. 1 and 2 has moved by at least a threshold change in position. In some examples, the threshold change in position may correspond to a minimum change in position of the core 212 of the solenoid valve 102 which the core 212 of the solenoid valve 102 is to exceed in connection with passing a solenoid valve test. In some examples, the threshold change in position may correspond to a relatively small, but detectable, change in the position of the core 212 of the solenoid valve 102. For example, the threshold change in position may correspond to a ripple and/or undulation in the position data sensed and/or measured via the position sensor 220 of the solenoid valve 102. If the position detector 302 of FIG. 3 determines at block 512 that the core 212 of the solenoid valve 102 has not moved by at least the threshold change in position, control of the example program 500 of FIG. 5 proceeds to block 514. If the position detector 302 of FIG. 3 instead determines at block 512 that the core 212 of the solenoid valve 102 has moved by at least the threshold change in position, control of the example program 500 of FIG. 5 proceeds to block 520.

At block 514, the state manager 310 of FIG. 3 determines whether the timer 312 of FIG. 3 has expired. For example, the state manager 310 may determine that the predetermined period, duration, and/or limit of the timed measurement of the timer 312 initiated at block 510 has expired and/or elapsed. If the state manager 310 determines at block 514 that the timer 312 has not expired, control of the example program 500 of FIG. 5 returns to block 512. If the state manager 310 instead determines at block 514 that the timer 312 has expired, control of the example program 500 of FIG. 5 proceeds to block 516.

At block 516, the state manager 310 of FIG. 3 and/or, more generally, the switchbox 104 of FIGS. 1 and 3, aborts the solenoid valve test. In some examples, the state manager 310 of FIG. 3 aborts the solenoid valve test by activating the solenoid valve 102 of FIGS. 1 and 2. For example, the state manager 310 may change the state of the solenoid valve 102 from the deactivated state (e.g., as initiated at block 508) in which the switchbox 104 does not provide power to the solenoid valve 102 back to the activated state in which the switchbox 104 provides power to the solenoid valve 102. Following block 516, control of the example program 500 of FIG. 5 proceeds to block 518.

At block 518, the notification generator 314 of FIG. 3 generates a notification indicating that the solenoid valve 102 of FIGS. 1 and 2 failed the solenoid valve test. In some examples, the notification generated by the notification generator 314 at block 518 may additionally or alternatively indicate that the solenoid valve 102 is not functioning properly. For example, the notification generated by the notification generator 314 at block 518 may indicate that the voltage supplied to the solenoid valve 102 did not satisfy the voltage threshold (e.g., as determined by the voltage detector 304 of FIG. 3 at block 504), that the current drawn by the solenoid valve 102 did not satisfy the current threshold (e.g., as determined by the current detector 306 of FIG. 3 at block 506), or that the core 212 of the solenoid valve 102 did not move by at least the threshold change in position prior to the expiration of the timer 312 of FIG. 3 (e.g., as determined by the position detector 302, the state manager 310, and the timer 312 of FIG. 3 at blocks 512 and 514). In some examples, the switchbox 104 of FIGS. 1 and 3 presents the notification generated by the notification generator 314 at block 518 via a display (e.g., an LCD screen) of the switchbox 104. In other examples, the switchbox 104 of FIGS. 1 and 3 additionally or alternatively transmits the notification generated by the notification generator 314 at block 518 from the switchbox 104 to a control system (e.g., the control system 116 of FIG. 1) operatively coupled to the switchbox 104. Following block 518, control of the example program 500 of FIG. 5 proceeds to block 524.

At block 520, the state manager 310 of FIG. 3 activates the solenoid valve 102 of FIGS. 1 and 2. For example, the state manager 310 may change the state of the solenoid valve 102 from the deactivated state (e.g., as initiated at block 508) in which the switchbox 104 does not provide power to the solenoid valve 102 back to the activated state in which the switchbox 104 provides power to the solenoid valve 102. Following block 520, control of the example program 500 of FIG. 5 proceeds to block 522.

At block 522, the notification generator 314 of FIG. 3 generates a notification indicating that the solenoid valve 102 of FIGS. 1 and 2 passed the solenoid valve test. In some examples, the notification generated by the notification generator 314 at block 522 may additionally or alternatively indicate that the solenoid valve 102 is functioning properly. For example, the notification generated by the notification generator 314 at block 522 may indicate that the voltage supplied to the solenoid valve 102 satisfied the voltage threshold (e.g., as determined by the voltage detector 304 of FIG. 3 at block 504), that the current drawn by the solenoid valve 102 satisfied the current threshold (e.g., as determined by the current detector 306 of FIG. 3 at block 506), and/or that the core 212 of the solenoid valve 102 moved by at least the threshold change in position prior to the expiration of the timer 312 of FIG. 3 (e.g., as determined by the position detector 302, the state manager 310, and the timer 312 of FIG. 3 at blocks 512 and 514). In some examples, the switchbox 104 of FIGS. 1 and 3 presents the notification generated by the notification generator 314 at block 522 via a display (e.g., an LCD screen) of the switchbox 104. In other examples, the switchbox 104 of FIGS. 1 and 3 additionally or alternatively transmits the notification generated by the notification generator 314 at block 522 from the switchbox 104 to a control system (e.g., the control system 116 of FIG. 1) operatively coupled to the switchbox 104. Following block 522, control of the example program 500 of FIG. 5 proceeds to block 524.

At block 524, the state manager 310 of FIG. 3 and/or, more generally, the switchbox 104 of FIGS. 1 and 3 determines whether to test the solenoid valve 102 of FIGS. 1 and 2 again. In some examples, the state manager 310 and/or the switchbox 104 may receive (e.g., via the input device(s) 322 of the user interface 316 of FIG. 3, or via the receiver 328 of the network interface 318 of FIG. 3) one or more input(s), signal(s), command(s) and/or instruction(s) indicating that the solenoid valve 102 is to be tested again. In other examples, the state manager 310 and/or the switchbox 104 may receive (e.g., via the input device(s) 322 of the user interface 316 of FIG. 3, or via the receiver 328 of the network interface 318 of FIG. 3) one or more input(s), signal(s), command(s) and/or instruction(s) indicating that the solenoid valve 102 is not to be tested again. If the state manager 310 and/or the switchbox 104 determine(s) at block 524 that the solenoid valve 102 is to be tested again, control of the example program 500 of FIG. 5 returns to block 502. If the state manager 310 and/or the switchbox 104 instead determine(s) at block 524 that the solenoid valve 102 is not to be tested again, the example program 500 of FIG. 5 ends.

FIG. 6 is a flowchart representative of second example machine-readable instructions 600 that may be executed to implement the example switchbox 104 of FIGS. 1 and 3 to monitor the health and/or functionality of the example solenoid valve 102 of FIGS. 1 and 2. The example program 600 of FIG. 6 begins when the switchbox 104 of FIGS. 1 and 3 determines whether to initiate a solenoid valve test (block 602). For example, the switchbox 104 may receive (e.g., via the input device(s) 322 of the user interface 316 of FIG. 3, or via the receiver 328 of the network interface 318 of FIG. 3) one or more input(s), signal(s), command(s) and/or instruction(s) indicating that a solenoid valve test is to be initiated. If the switchbox 104 does not determine at block 602 that a solenoid valve test is to be initiated, control of the example program 600 of FIG. 6 remains at block 602. If the switchbox 104 instead determines at block 602 that a solenoid valve test is to be initiated, control of the example program 600 of FIG. 6 proceeds to block 604.

At block 604, the state manager 310 of FIG. 3 activates the solenoid valve 102 of FIGS. 1 and 2. For example, the state manager 310 may change the state of the solenoid valve 102 from a deactivated state in which the switchbox 104 of FIGS. 1 and 3 does not provide power to the solenoid valve 102 to an activated state in which the switchbox 104 of FIGS. 1 and 3 provides power to the solenoid valve 102.

Following block 604, control of the example program 600 of FIG. 6 proceeds to block 606.

At block 606, the state manager 310 of FIG. 3 initiates the timer 312 of FIG. 3. For example, the state manager 310 may signal, command, and/or instruct the timer 312 to initiate a timed measurement (e.g., from time zero upward to a time limit, or from a time limit downward to time zero) having a predetermined period, duration, and/or limit. Following block 606, control of the example program 600 of FIG. 6 proceeds to block 608.

At block 608, the voltage detector 304 of FIG. 3 determines whether a voltage supplied to the solenoid valve 102 of FIGS. 1 and 2 satisfies a voltage threshold. For example, the voltage detector 304 may determine that a voltage supplied to the solenoid valve 102 satisfies a first voltage threshold that requires the voltage to be less than a predetermined maximum voltage. As another example, the voltage detector 304 may determine that a voltage supplied to the solenoid valve 102 satisfies a second voltage threshold that requires the voltage to be greater than a predetermined minimum voltage. As another example, the voltage detector 304 may determine that a voltage supplied to the solenoid valve 102 satisfies a third voltage threshold that requires the voltage to be both greater than a predetermined minimum voltage and less than a predetermined maximum voltage. If the voltage detector 304 determines at block 608 that the voltage supplied to the solenoid valve 102 satisfies the voltage threshold, control of the example program 600 of FIG. 6 proceeds to block 610. If the voltage detector 304 instead determines at block 608 that the voltage supplied to the solenoid valve 102 does not satisfy the voltage threshold, control of the example program 600 of FIG. 6 proceeds to block 616.

At block 610, the current detector 306 of FIG. 3 determines whether a current drawn by the solenoid valve 102 of FIGS. 1 and 2 satisfies a current threshold. For example, the current detector 306 may determine that a current drawn by the solenoid valve 102 satisfies a first current threshold that requires the current to be less than a predetermined maximum current. As another example, the current detector 306 may determine that a current drawn by the solenoid valve 102 satisfies a second current threshold that requires the current to be greater than a predetermined minimum current. As another example, the current detector 306 may determine that a current drawn by the solenoid valve 102 satisfies a third current threshold that requires the current to be both greater than a predetermined minimum current and less than a predetermined maximum current. If the current detector 306 determines at block 610 that the current drawn by the solenoid valve 102 satisfies the current threshold, control of the example program 600 of FIG. 6 proceeds to block 612. If the current detector 306 instead determines at block 610 that the current drawn by the solenoid valve 102 does not satisfy the current threshold, control of the example program 600 of FIG. 6 proceeds to block 616.

At block 612, the position detector 302 of FIG. 3 determines whether the core 212 of the solenoid valve 102 of FIGS. 1 and 2 has moved by at least a threshold change in position. In some examples, the threshold change in position may correspond to a minimum change in position of the core 212 of the solenoid valve 102 which the core 212 of the solenoid valve 102 is to exceed in connection with passing a solenoid valve test. In some examples, the threshold change in position may correspond to a relatively small, but detectable, change in the position of the core 212 of the solenoid valve 102. For example, the threshold change in position may correspond to a ripple and/or undulation in the position data sensed and/or measured via the position sensor 220 of the solenoid valve 102. If the position detector 302 of FIG. 3 determines at block 612 that the core 212 of the solenoid valve 102 has not moved by at least the threshold change in position, control of the example program 600 of FIG. 6 proceeds to block 614. If the position detector 302 of FIG. 3 instead determines at block 612 that the core 212 of the solenoid valve 102 has moved by at least the threshold change in position, control of the example program 600 of FIG. 6 proceeds to block 620.

At block 614, the state manager 310 of FIG. 3 determines whether the timer 312 of FIG. 3 has expired. For example, the state manager 310 may determine that the predetermined period, duration, and/or limit of the timed measurement of the timer 312 initiated at block 606 has expired and/or elapsed. If the state manager 310 determines at block 614 that the timer 312 has not expired, control of the example program 600 of FIG. 6 returns to block 612. If the state manager 310 instead determines at block 614 that the timer 312 has expired, control of the example program 600 of FIG. 6 proceeds to block 616.

At block 616, the state manager 310 of FIG. 3 and/or, more generally, the switchbox 104 of FIGS. 1 and 3, aborts the solenoid valve test. In some examples, the state manager 310 of FIG. 3 aborts the solenoid valve test by deactivating the solenoid valve 102 of FIGS. 1 and 2. For example, the state manager 310 may change the state of the solenoid valve 102 from the activated state (e.g., as initiated at block 604) in which the switchbox 104 provides power to the solenoid valve 102 back to the deactivated state in which the switchbox 104 does not provide power to the solenoid valve 102. Following block 616, control of the example program 600 of FIG. 6 proceeds to block 618.

At block 618, the notification generator 314 of FIG. 3 generates a notification indicating that the solenoid valve 102 of FIGS. 1 and 2 failed the solenoid valve test. In some examples, the notification generated by the notification generator 314 at block 518 may additionally or alternatively indicate that the solenoid valve 102 is not functioning properly. For example, the notification generated by the notification generator 314 at block 618 may indicate that the voltage supplied to the solenoid valve 102 did not satisfy the voltage threshold (e.g., as determined by the voltage detector 304 of FIG. 3 at block 608), that the current drawn by the solenoid valve 102 did not satisfy the current threshold (e.g., as determined by the current detector 306 of FIG. 3 at block 610), or that the core 212 of the solenoid valve 102 did not move by at least the threshold change in position prior to the expiration of the timer 312 of FIG. 3 (e.g., as determined by the position detector 302, the state manager 310, and the timer 312 of FIG. 3 at blocks 612 and 614). In some examples, the switchbox 104 of FIGS. 1 and 3 presents the notification generated by the notification generator 314 at block 618 via a display (e.g., an LCD screen) of the switchbox 104. In other examples, the switchbox 104 of FIGS. 1 and 3 additionally or alternatively transmits the notification generated by the notification generator 314 at block 618 from the switchbox 104 to a control system (e.g., the control system 116 of FIG. 1) operatively coupled to the switchbox 104. Following block 618, control of the example program 600 of FIG. 6 proceeds to block 624.

At block 620, the state manager 310 of FIG. 3 activates the solenoid valve 102 of FIGS. 1 and 2. For example, the state manager 310 may change the state of the solenoid valve 102 from the activated state (e.g., as initiated at block 604) in which the switchbox 104 provides power to the solenoid valve 102 back to the deactivated state in which the switchbox 104 does not provide power to the solenoid valve 102. Following block 620, control of the example program 600 of FIG. 6 proceeds to block 622.

At block 622, the notification generator 314 of FIG. 3 generates a notification indicating that the solenoid valve 102 of FIGS. 1 and 2 passed the solenoid valve test. In some examples, the notification generated by the notification generator 314 at block 622 may additionally or alternatively indicate that the solenoid valve 102 is functioning properly. For example, the notification generated by the notification generator 314 at block 622 may indicate that the voltage supplied to the solenoid valve 102 satisfied the voltage threshold (e.g., as determined by the voltage detector 304 of FIG. 3 at block 608), that the current drawn by the solenoid valve 102 satisfied the current threshold (e.g., as determined by the current detector 306 of FIG. 3 at block 610), and/or that the core 212 of the solenoid valve 102 moved by at least the threshold change in position prior to the expiration of the timer 312 of FIG. 3 (e.g., as determined by the position detector 302, the state manager 310, and the timer 312 of FIG. 3 at blocks 612 and 614). In some examples, the switchbox 104 of FIGS. 1 and 3 presents the notification generated by the notification generator 314 at block 622 via a display (e.g., an LCD screen) of the switchbox 104. In other examples, the switchbox 104 of FIGS. 1 and 3 additionally or alternatively transmits the notification generated by the notification generator 314 at block 622 from the switchbox 104 to a control system (e.g., the control system 116 of FIG. 1) operatively coupled to the switchbox 104. Following block 622, control of the example program 600 of FIG. 6 proceeds to block 624.

At block 624, the state manager 310 of FIG. 3 and/or, more generally, the switchbox 104 of FIGS. 1 and 3 determines whether to test the solenoid valve 102 of FIGS. 1 and 2 again. In some examples, the state manager 310 and/or the switchbox 104 may receive (e.g., via the input device(s) 322 of the user interface 316 of FIG. 3, or via the receiver 328 of the network interface 318 of FIG. 3) one or more input(s), signal(s), command(s) and/or instruction(s) indicating that the solenoid valve 102 is to be tested again. In other examples, the state manager 310 and/or the switchbox 104 may receive (e.g., via the input device(s) 322 of the user interface 316 of FIG. 3, or via the receiver 328 of the network interface 318 of FIG. 3) one or more input(s), signal(s), command(s) and/or instruction(s) indicating that the solenoid valve 102 is not to be tested again. If the state manager 310 and/or the switchbox 104 determine(s) at block 624 that the solenoid valve 102 is to be tested again, control of the example program 600 of FIG. 6 returns to block 602. If the state manager 310 and/or the switchbox 104 instead determine(s) at block 624 that the solenoid valve 102 is not to be tested again, the example program 600 of FIG. 6 ends.

Figure 7:
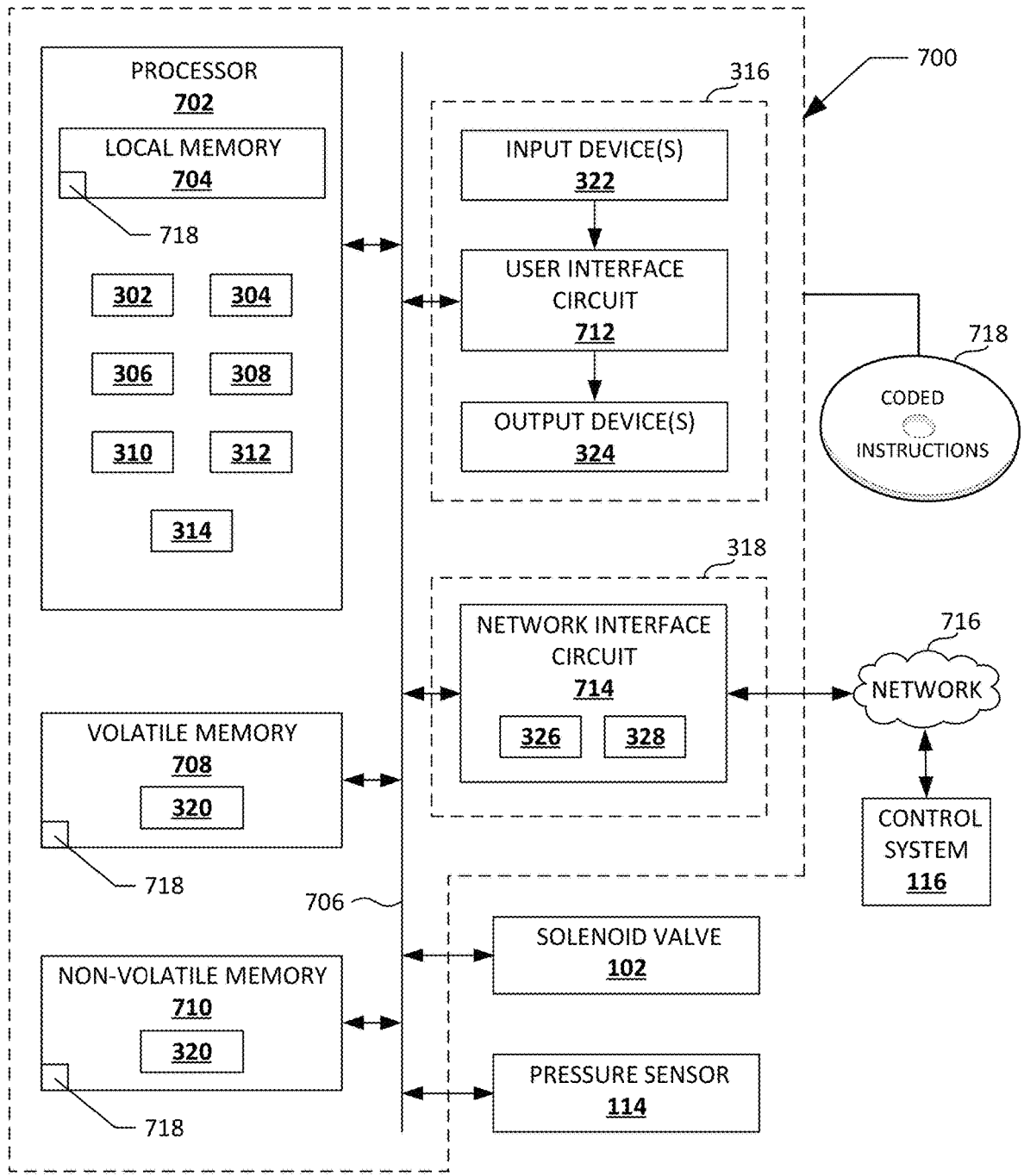
FIG. 7 is a block diagram of an example processor platform structured to execute the first example machine-readable instructions of FIG. 5 and/or the second example machine-readable instructions of FIG. 6 to implement the example switchbox of FIGS. 1 and 3.

FIG. 7 is a block diagram of an example processor platform 700 structured to execute the first example machine-readable instructions 500 of FIG. 5 and/or the second example machine-readable instructions 600 of FIG. 6 to implement the example switchbox 104 of FIGS. 1 and 3. The processor platform 700 of the illustrated example includes a processor 702. The processor 702 of the illustrated example is hardware. For example, the processor 702 can be implemented by one or more integrated circuit(s), logic circuit(s), microprocessor(s), GPU(s), DSP(s), microcontroller(s), processor(s), or microcontroller(s) from any desired family or manufacturer. The hardware processor may be a semiconductor based (e.g., silicon based) device. In this example, the processor 702 implements the example position detector 302, the example voltage detector 304, the example current detector 306, the example pressure detector 308, the example state manager 310, the example timer 312, and the example notification generator 314 of FIG. 3.

The processor 702 of the illustrated example includes a local memory 704 (e.g., a cache). The processor 702 is in communication with the example solenoid valve 102 of FIGS. 1 and 2 and the example pressure sensor 114 of FIG. 1 via a bus 706. The processor 702 is also in communication with a main memory including a volatile memory 708 and a non-volatile memory 710 via the bus 706. The volatile memory 708 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 710 may be implemented by flash memory and/or any other desired type of memory device. Access to the main memory 708, 710 is controlled by a memory controller. In the illustrated example of FIG. 7, the volatile memory 708 and/or the non-volatile memory 710 implement(s) the example memory 320 of FIG. 3.

The processor platform 700 of the illustrated example also includes a user interface circuit 712. The user interface circuit 712 may be implemented by any type of interface standard, such as an Ethernet interface, a universal serial bus (USB), a Bluetooth® interface, a near field communication (NFC) interface, and/or a PCI express interface. In the illustrated example, one or more input device(s) 322 of FIG. 3 are connected to the user interface circuit 712. The input device(s) 322 permit(s) a user to enter data and/or commands into the processor 702. The input device(s) 322 can be implemented by, for example, a button, a switch, a knob, a touchscreen, an audio sensor, and/or a microphone. One or more output device(s) 324 of FIG. 3 are also connected to the user interface circuit 712 of the illustrated example. The output device(s) 324 can be implemented, for example, by a light emitting diode, a touchscreen, and/or a liquid crystal display for presenting visual information, and/or a speaker for presenting audible information. The user interface circuit 712 of the illustrated example, thus, typically includes a graphics driver card, a graphics driver chip and/or a graphics driver processor. In the illustrated example, the input device(s) 322, the output device(s) 324, and the user interface circuit 712 collectively implement the example user interface 316 of FIG. 3.

The processor platform 700 of the illustrated example also includes a network interface circuit 714. The network interface circuit 714 may be implemented by any type of interface standard, such as 4-20 mA wiring and/or one or more communication protocol(s) including, for example, HART, TCP/IP, Foundation Fieldbus, Profinet, Modbus and/or Ethernet. The network interface circuit 714 may include a transmitter, a receiver, and/or a transceiver to facilitate the exchange of data and/or signals with external machines (e.g., a server, a computing device, etc.) via a network 716. In the illustrated example of FIG. 7, the network interface circuit 714 includes the example transmitter 326 and the example receiver 328 of FIG. 3, and is configured to exchange data and/or signals with the control system 116 of FIG. 1 via the network 716. As shown in FIG. 7, the transmitter 326, the receiver 328, and the network interface circuit 714 collectively implement the example network interface 318 of FIG. 3.

Coded instructions 718 including the first example machine-readable instructions 500 of FIG. 5 and/or the second example machine-readable instructions 600 of FIG. 6 may be stored in the local memory 704, in the volatile memory 708, in the non-volatile memory 710, and/or on a removable non-transitory computer-readable storage medium such as a flash memory stick, a CD, or a DVD.

From the foregoing, it will be appreciated that methods and apparatus have been disclosed that test and/or evaluate the health and/or functionality of a solenoid valve in a manner that advantageously prevents an actuator and/or a main valve that is/are operatively coupled to the solenoid valve from moving during and/or in response to the testing of the solenoid valve. As a result, testing and/or evaluating a solenoid valve according to example methods and apparatus disclosed herein does not interfere with the normal and/or intended operation of the actuator and/or the main valve. In some disclosed examples, the health and/or functionality of a solenoid valve is tested and/or evaluated based on multiple measured parameters associated with the solenoid valve including, for example, a measured position of a core of the solenoid valve, and one or more of a measured voltage supplied to the solenoid valve, a measured current drawn by the solenoid valve, and/or a measured downstream line pressure associated with the solenoid valve. In such multi-parameter examples, the testing and/or evaluating of the health and/or functionality of the solenoid valve via example methods and apparatus disclosed herein advantageously provides a diagnostic analysis that is relatively more comprehensive than that provided by the above-described known methods for testing and/or evaluating the health and/or functionality of a solenoid valve.

In some examples, a switchbox is disclosed. In some disclosed examples, the switchbox comprises a state manager, a position detector, and a notification generator. In some disclosed examples, the state manager is configured to change an activation state of a solenoid valve between a first state and a second state in response to an initiation signal of a solenoid valve test. In some disclosed examples, the solenoid valve is operatively coupled to the switchbox. In some disclosed examples, the position detector is configured to determine, based on position data obtained at the switchbox from an integrated position sensor of the solenoid valve, whether a core of the solenoid valve has moved by at least a threshold change in position within a predetermined time period following the change of the activation state of the solenoid valve from the first state to the second state. In some disclosed examples, the notification generator is configured to generate a notification in response to the position detector determining that the core did not move by at least the threshold change in position within the predetermined time period. In some disclosed examples, the notification is to indicate that the solenoid valve failed the solenoid valve test.

In some disclosed examples, the state manager is configured to change the activation state of the solenoid valve from the second state back to the first state in response to the position detector determining that the core moved by at least the threshold change in position within the predetermined time period.

In some disclosed examples, the state manager is configured to initiate a timer of the switchbox in response to the change of the activation state of the solenoid valve from the first state to the second state. In some disclosed examples, the timer has a duration corresponding to the predetermined time period.

In some disclosed examples, the state manager is configured to change the activation state of the solenoid valve from the second state back to the first state in response to an expiration of the duration of the timer.

In some disclosed examples, the duration of the timer is configured to expire prior to an actuator operatively coupled to the solenoid valve moving in response to the change of the activation state of the solenoid valve from the first state to the second state.

In some disclosed examples, the first state is an activated state in which the switchbox is configured to provide power to the solenoid valve, and the second state is a deactivated state in which the switchbox is configured not to provide power to the solenoid valve.

In some disclosed examples, the first state is a deactivated state in which the switchbox is configured not to provide power to the solenoid valve, and the second state is an activated state in which the switchbox is configured to provide power to the solenoid valve.

In some disclosed examples, the notification is a first notification, and the notification generator is further configured to generate a second notification in response to the position detector determining that the core moved by at least the threshold change in position within the predetermined time period. In some disclosed examples, the second notification is to indicate that the solenoid valve passed the solenoid valve test.

In some disclosed examples, the notification is a first notification, and the notification generator is further configured to generate a second notification in response to a voltage detector of the switchbox determining that a voltage supplied to the solenoid valve does not satisfy a voltage threshold. In some disclosed examples, the second notification is to indicate that the solenoid valve failed the solenoid valve test.

In some disclosed examples, the notification is a first notification, and the notification generator is further configured to generate a second notification in response to a current detector of the switchbox determining that a current drawn by the solenoid valve does not satisfy a current threshold. In some disclosed examples, the second notification is to indicate that the solenoid valve failed the solenoid valve test.

In some disclosed examples, the switchbox further comprises a display configured to present the notification at the switchbox.

In some disclosed examples, the switchbox further comprises a transmitter configured to transmit the notification from the switchbox to a control system operatively coupled to the switchbox.

In some examples, a method is disclosed. In some disclosed examples, the method comprises changing, via a switchbox, an activation state of a solenoid valve between a first state and a second state in response to an initiation signal of a solenoid valve test. In some disclosed examples, the solenoid valve is operatively coupled to the switchbox. In some disclosed examples, the method comprises determining, at the switchbox, based on position data obtained from an integrated position sensor of the solenoid valve, whether a core of the solenoid valve has moved by at least a threshold change in position within a predetermined time period following the changing of the activation state of the solenoid valve from the first state to the second state. In some disclosed examples, the method comprises generating, at the switchbox, a notification in response to determining that the core did not move by at least the threshold change in position within the predetermined time period. In some disclosed examples, the notification indicates that the solenoid valve failed the solenoid valve test.

In some disclosed examples, the method further comprises changing, via the switchbox, the activation state of the solenoid valve from the second state back to the first state in response to determining that the core moved by at least the threshold change in position within the predetermined time period.

In some disclosed examples, the method further comprises initiating a timer of the switchbox in response to the changing of the activation state of the solenoid valve from the first state to the second state. In some disclosed examples, the timer has a duration corresponding to the predetermined time period.

In some disclosed examples, the method further comprises changing, via the switchbox, the activation state of the solenoid valve from the second state back to the first state in response to the duration of the timer expiring.

In some disclosed examples of the method, the duration of the timer is configured to expire prior to an actuator operatively coupled to the solenoid valve moving in response to the changing of the activation state of the solenoid valve from the first state to the second state.

In some examples, a non-transitory computer-readable storage medium comprising instructions is disclosed. In some disclosed examples, the instructions, when executed, cause one or more processors of a switchbox to change an activation state of a solenoid valve between a first state and a second state in response to an initiation signal of a solenoid valve test. In some disclosed examples, the solenoid valve is operatively coupled to the switchbox. In some disclosed examples, the instructions, when executed, cause the one or more processors of the switchbox to determine, based on position data obtained from an integrated position sensor of the solenoid valve, whether a core of the solenoid valve has moved by at least a threshold change in position within a predetermined time period following the change of the activation state of the solenoid valve from the first state to the second state. In some disclosed examples, the instructions, when executed, cause the one or more processors of the switchbox to generate a notification in response to determining that the core did not move by at least the threshold change in position within the predetermined time period. In some disclosed examples, the notification is to indicate that the solenoid valve failed the solenoid valve test.

In some disclosed examples, the instructions, when executed, further cause the one or more processors of the switchbox to change the activation state of the solenoid valve from the second state back to the first state in response to determining that the core moved by at least the threshold change in position within the predetermined time period.

In some disclosed examples, the instructions, when executed, further cause the one or more processors of the switchbox to initiate a timer in response to the change of the activation state of the solenoid valve from the first state to the second state. In some disclosed examples, the timer has a duration corresponding to the predetermined time period.

In some disclosed examples, the instructions, when executed, further cause the one or more processors of the switchbox to change the activation state of the solenoid valve from the second state back to the first state in response to the duration of the timer expiring.

In some disclosed examples of the non-transitory computer-readable storage medium, the duration of the timer is configured to expire prior to an actuator operatively coupled to the solenoid valve moving in response to the change of the activation state of the solenoid valve from the first state to the second state.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A switchbox, comprising:
   a state manager configured to change an activation state of a solenoid valve between a first state and a second state in response to an initiation signal of a solenoid valve test, the solenoid valve operatively coupled to the switchbox;
   a position detector configured to determine, based on position data obtained at the switchbox from an integrated position sensor of the solenoid valve, whether a core of the solenoid valve has moved by at least a threshold change in position within a predetermined time period following the change of the activation state of the solenoid valve from the first state to the second state; and
   a notification generator configured to generate a notification in response to the position detector determining that the core did not move by at least the threshold change in position within the predetermined time period, the notification to indicate that the solenoid valve failed the solenoid valve test;
   wherein the state manager is configured to change the activation state of the solenoid valve from the second state back to the first state in response to the position detector determining that the core moved by at least the threshold change in position within the predetermined time period.

2. The switchbox of claim 1, wherein the state manager is configured to initiate a timer of the switchbox in response to the change of the activation state of the solenoid valve from the first state to the second state, the timer having a duration corresponding to the predetermined time period.

3. The switchbox of claim 2, wherein the state manager is configured to change the activation state of the solenoid valve from the second state back to the first state in response to an expiration of the duration of the timer.

4. The switchbox of claim 2, wherein the duration of the timer is configured to expire prior to an actuator operatively coupled to the solenoid valve moving in response to the change of the activation state of the solenoid valve from the first state to the second state.

5. The switchbox of claim 1, wherein the first state is an activated state in which the switchbox is configured to provide power to the solenoid valve, and the second state is a deactivated state in which the switchbox is configured not to provide power to the solenoid valve.

6. The switchbox of claim 1, wherein the first state is a deactivated state in which the switchbox is configured not to provide power to the solenoid valve, and the second state is an activated state in which the switchbox is configured to provide power to the solenoid valve.

7. The switchbox of claim 1, wherein the notification is a first notification, and wherein the notification generator is further configured to generate a second notification in response to the position detector determining that the core moved by at least the threshold change in position within the predetermined time period, the second notification to indicate that the solenoid valve passed the solenoid valve test.

8. The switchbox of claim 1, wherein the notification is a first notification, and wherein the notification generator is further configured to generate a second notification in response to a voltage detector of the switchbox determining that a voltage supplied to the solenoid valve does not satisfy a voltage threshold, the second notification to indicate that the solenoid valve failed the solenoid valve test.

9. The switchbox of claim 1, wherein the notification is a first notification, and wherein the notification generator is further configured to generate a second notification in response to a current detector of the switchbox determining that a current drawn by the solenoid valve does not satisfy a current threshold, the second notification to indicate that the solenoid valve failed the solenoid valve test.

10. The switchbox of claim 1, further comprising a display configured to present the notification at the switchbox.

11. The switchbox of claim 1, further comprising a transmitter configured to transmit the notification from the switchbox to a control system operatively coupled to the switchbox.

12. A method, comprising:
changing, via a switchbox, an activation state of a solenoid valve between a first state and a second state in response to an initiation signal of a solenoid valve test, the solenoid valve operatively coupled to the switchbox;
determining, at the switchbox, based on position data obtained from an integrated position sensor of the solenoid valve, whether a core of the solenoid valve has moved by at least a threshold change in position within a predetermined time period following the changing of the activation state of the solenoid valve from the first state to the second state;
changing, via the switchbox, the activation state of the solenoid valve from the second state back to the first state in response to determining that the core moved by at least the threshold change in position within the predetermined time period; and
generating, at the switchbox, a notification in response to determining that the core did not move by at least the threshold change in position within the predetermined time period, the notification indicating that the solenoid valve failed the solenoid valve test.

13. The method of claim 12, further comprising initiating a timer of the switchbox in response to the changing of the activation state of the solenoid valve from the first state to the second state, the timer having a duration corresponding to the predetermined time period.

14. The method of claim 13, further comprising changing, via the switchbox, the activation state of the solenoid valve from the second state back to the first state in response to the duration of the timer expiring.

15. The method of claim 13, wherein the duration of the timer is configured to expire prior to an actuator operatively coupled to the solenoid valve moving in response to the changing of the activation state of the solenoid valve from the first state to the second state.

16. The method of claim 12, wherein the first state is an activated state in which the switchbox provides power to the solenoid valve, and the second state is a deactivated state in which the switchbox does not provide power to the solenoid valve.

17. The method of claim 12, wherein the first state is a deactivated state in which the switchbox does not provide power to the solenoid valve, and the second state is an activated state in which the switchbox provides power to the solenoid valve.

18. The method of claim 12, wherein the notification is a first notification, the method further comprising generating, at the switchbox, a second notification in response to determining that the core moved by at least the threshold change in position within the predetermined time period, the second notification indicating that the solenoid valve passed the solenoid valve test.

19. A non-transitory computer-readable storage medium comprising instructions that, when executed, cause one or more processors of a switchbox to at least:
change an activation state of a solenoid valve between a first state and a second state in response to an initiation signal of a solenoid valve test, the solenoid valve operatively coupled to the switchbox;
determine, based on position data obtained from an integrated position sensor of the solenoid valve, whether a core of the solenoid valve has moved by at least a threshold change in position within a predetermined time period following the change of the activation state of the solenoid valve from the first state to the second state;
change the activation state of the solenoid valve from the second state back to the first state in response to determining that the core moved by at least the threshold change in position within the predetermined time period; and
generate a notification in response to determining that the core did not move by at least the threshold change in position within the predetermined time period, the notification to indicate that the solenoid valve failed the solenoid valve test.

20. The non-transitory computer-readable storage medium of claim 19, wherein the instructions, when executed, cause the one or more processors to initiate a timer in response to the change of the activation state of the solenoid valve from the first state to the second state, the timer having a duration corresponding to the predetermined time period.

21. The non-transitory computer-readable storage medium of claim 20, wherein the instructions, when executed, cause the one or more processors to change the activation state of the solenoid valve from the second state back to the first state in response to the duration of the timer expiring.

22. The non-transitory computer-readable storage medium of claim 20, wherein the duration of the timer is configured to expire prior to an actuator operatively coupled to the solenoid valve moving in response to the change of the activation state of the solenoid valve from the first state to the second state.

\* \* \* \* \*